(12) United States Patent
Takahashi et al.

(10) Patent No.: US 11,590,871 B2
(45) Date of Patent: Feb. 28, 2023

(54) SEAT PAD, VEHICLE SEAT, VEHICLE SEAT CONTROLLING METHOD, AND SEAT PAD MANUFACTURING METHOD

(71) Applicant: Archem Inc., Tokyo (JP)

(72) Inventors: Yoshiyuki Takahashi, Tokyo (JP); Taisuke Yonezawa, Tokyo (JP); Yukiko Tsugawa, Tokyo (JP)

(73) Assignee: Archem Inc., Tokyo (JP)

( * ) Notice: Subject to any disclaimer, the term of this patent is extended or adjusted under 35 U.S.C. 154(b) by 164 days.

(21) Appl. No.: 16/771,687

(22) PCT Filed: Oct. 2, 2018

(86) PCT No.: PCT/JP2018/036931
§ 371 (c)(1),
(2) Date: Jun. 11, 2020

(87) PCT Pub. No.: WO2019/116685
PCT Pub. Date: Jun. 20, 2019

(65) Prior Publication Data
US 2021/0086677 A1 Mar. 25, 2021

(30) Foreign Application Priority Data

Dec. 14, 2017 (JP) .............................. JP2017-239881
Dec. 14, 2017 (JP) .............................. JP2017-239900

(51) Int. Cl.
*B60N 2/90* (2018.01)
*B60N 2/58* (2006.01)
(Continued)

(52) U.S. Cl.
CPC .......... *B60N 2/914* (2018.02); *B29C 44/1266* (2013.01); *B60N 2/5891* (2013.01); *B60N 2/72* (2013.01); *B68G 7/00* (2013.01); *B29K 2075/00* (2013.01); *B29K 2105/04* (2013.01); *B29L 2031/3005* (2013.01); *B29L 2031/771* (2013.01)

(58) Field of Classification Search
CPC .............................. B60N 2/914; B60N 2/5891
See application file for complete search history.

(56) References Cited

U.S. PATENT DOCUMENTS 4,060,276 A * 11/1977 Lindsay ................... A47C 7/74
297/382
4,592,588 A * 6/1986 Isono ..................... A47C 7/029
297/284.6
(Continued)

FOREIGN PATENT DOCUMENTS

CN 103373259 A * 10/2013 ........... B60N 2/0232
CN 203844640 U 9/2014
(Continued)

OTHER PUBLICATIONS

Nov. 20, 2018, International Search Report issued in the International Patent Application No. PCT/JP2018/036931.
(Continued)

*Primary Examiner* — Timothy J Brindley
(74) *Attorney, Agent, or Firm* — Kenja IP Law PC

(57) ABSTRACT

According to the disclosure, a seat pad 2 includes a bag-contained pad part 250 including a foam body 240 and a bag body 230 arranged inside the foam body 240.

13 Claims, 25 Drawing Sheets

(51) Int. Cl.
   *B29C 44/12* (2006.01)
   *B60N 2/72* (2006.01)
   *B68G 7/00* (2006.01)
   *B29K 75/00* (2006.01)
   *B29K 105/04* (2006.01)
   *B29L 31/30* (2006.01)
   *B29L 31/00* (2006.01)

(56) References Cited

U.S. PATENT DOCUMENTS

| | | | |
|---|---|---|---|
| 5,711,573 A * | 1/1998 | Daniels | B62J 1/26 |
| | | | 297/284.6 |
| 9,283,867 B2 | 3/2016 | Nil et al. | |
| 9,550,439 B2 | 1/2017 | Dry | |
| 2007/0057551 A1 * | 3/2007 | Lachenmann | B60N 2/914 |
| | | | 297/284.9 |
| 2009/0188045 A1 * | 7/2009 | Anikin | B60N 2/7005 |
| | | | 5/654 |
| 2014/0290389 A1 | 10/2014 | Nii et al. | |
| 2016/0106225 A1 | 4/2016 | Ham et al. | |
| 2016/0207429 A1 | 7/2016 | Fitzpatrick et al. | |
| 2017/0088026 A1 * | 3/2017 | Patterson | B60N 2/914 |
| 2019/0283638 A1 * | 9/2019 | Lett | B60N 2/686 |

FOREIGN PATENT DOCUMENTS

| | | | | |
|---|---|---|---|---|
| CN | 105530836 A | 4/2016 | | |
| CN | 105882474 A | 8/2016 | | |
| DE | 202015106897 U1 | 2/2016 | | |
| DE | 102016113596 A1 * | 2/2017 | | B60N 2/20 |
| DE | 102017104991 A1 * | 9/2017 | | B60N 2/002 |
| JP | S60154045 U | 10/1985 | | |
| JP | H10229930 A | 9/1998 | | |
| JP | 2001211956 A | 8/2001 | | |
| JP | 2003189972 A | 7/2003 | | |
| JP | 2004268692 A | 9/2004 | | |
| JP | 2007006911 A | 1/2007 | | |
| JP | 2011194962 A | 10/2011 | | |
| JP | 2014193689 A | 10/2014 | | |
| KR | 2019980043885 U | 9/1998 | | |
| KR | 2019980047059 U | 9/1998 | | |
| WO | WO-2015017277 A1 * | 2/2015 | | B60N 2/4415 |

OTHER PUBLICATIONS

Jun. 16, 2020, International Preliminary Report on Patentability issued in the International Patent Application No. PCT/JP2018/036931.

Nov. 29, 2021, search result of Office Action issued by the China National Intellectual Property Administration in the corresponding Chinese Patent Application No. 201880080679.6.

* cited by examiner

FIG. 1
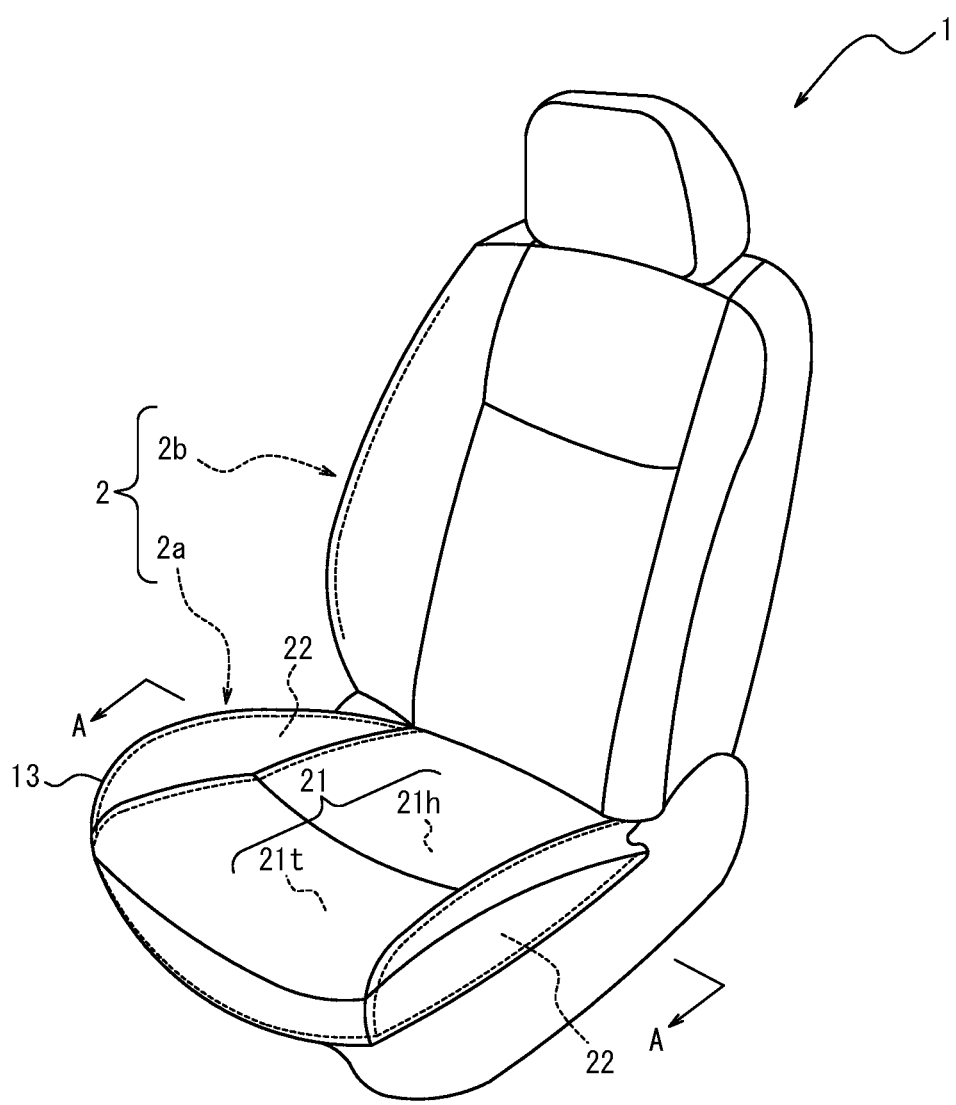
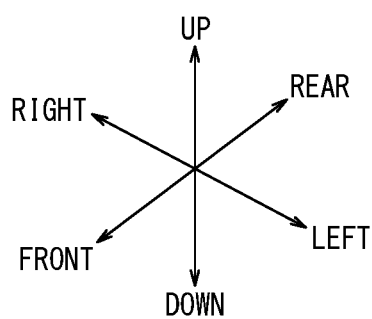

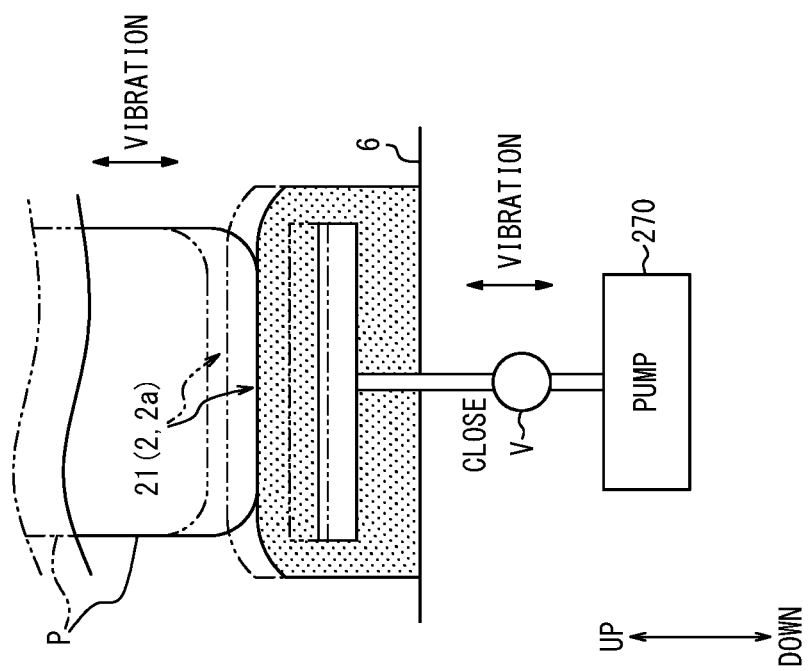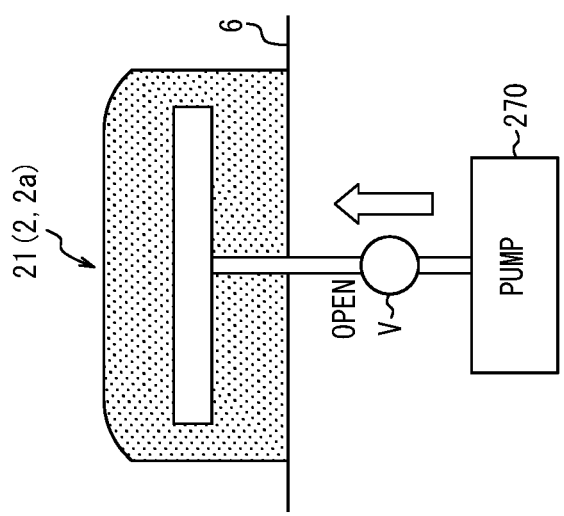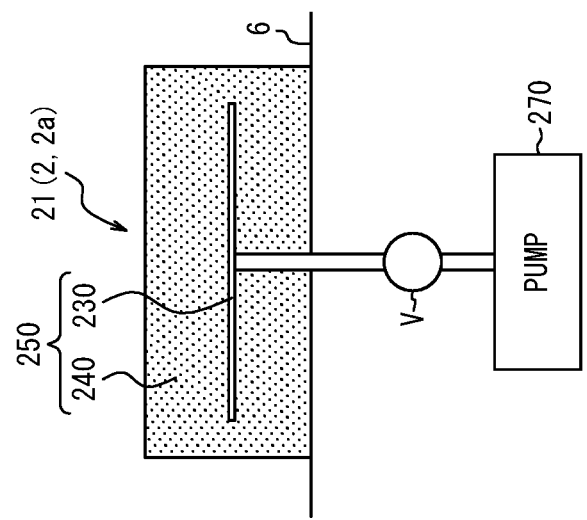

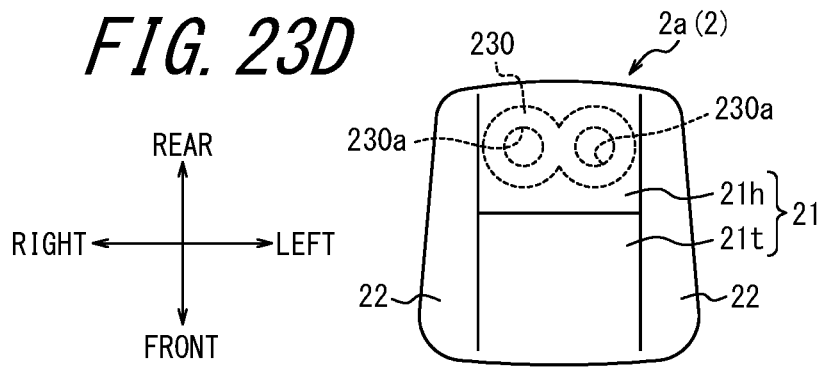
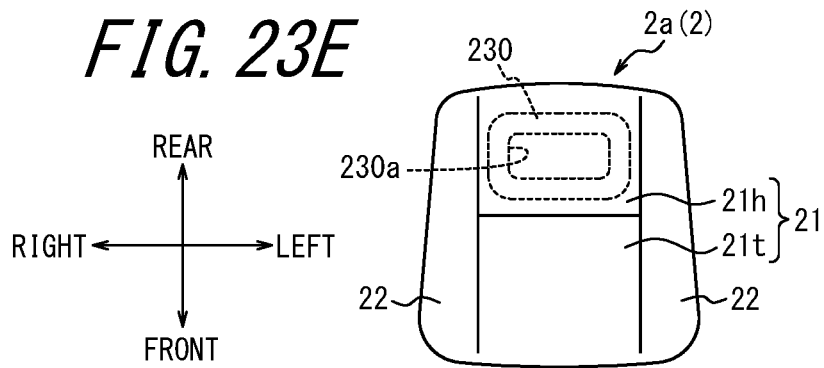
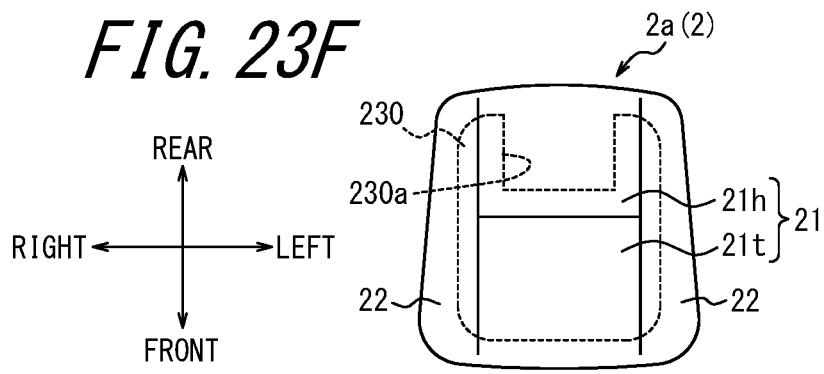
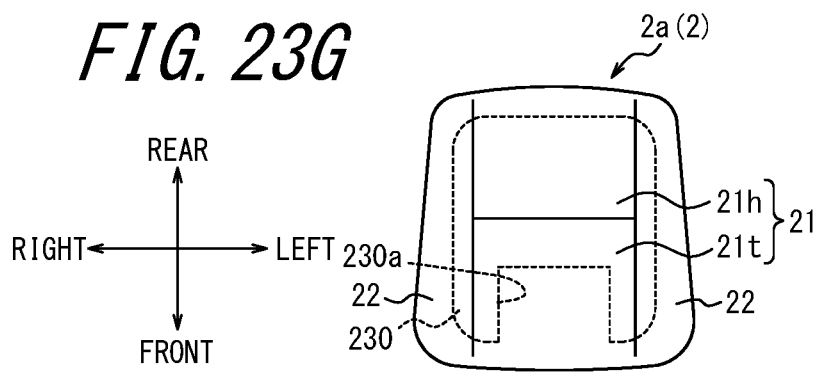

SEAT PAD, VEHICLE SEAT, VEHICLE SEAT CONTROLLING METHOD, AND SEAT PAD MANUFACTURING METHOD

TECHNICAL FIELD

The disclosure relates to a seat pad, a vehicle seat, a vehicle seat controlling method, and a seat pad manufacturing method.

BACKGROUND

In the related art, as a method of changing characteristics of vibration felt by an occupant of a vehicle seat during traveling of a vehicle, there is a method of changing an opening area of a ventilation window of a pan frame provided on a back side of a cushion pad of a seat pad to change air permeability of the cushion pad (see PTL 1). According to such a method, vibration transmissibility (resonance magnification) can be increased as air permeability increases, and vibration transmissibility can be reduced as air permeability reduces.

CITATION LIST

Patent Literature

PTL 1: Japanese Patent Application Laid-Open Publication No. 2001-211956

SUMMARY

Technical Problem

However, in the method of PTL 1, it is not possible to change a compression deflection curve (hereinafter, also referred to as "static waveform") indicating characteristics when the cushion pad is compressed slowly, and to change a sense of seating that the occupant feels when taking a seat.

An object of the disclosure is to provide a seat pad, a vehicle seat, a vehicle seat controlling method and a seat pad manufacturing method capable of changing both the vibration transmissibility and the sense of seating of a seat pad which is a component of the vehicle seat.

Solution to Problem

A seat pad of the disclosure includes:
a bag-contained pad part including a foam body and a bag body arranged inside the foam body.

A vehicle seat of the disclosure includes:
the seat pad; and
a pump connected to the bag body to be capable of supplying a fluid to an inside of the bag body.

A vehicle seat controlling method of the disclosure is a vehicle seat controlling method in the vehicle seat, wherein
the controller controls the pump according to a signal from the outside.

A seat pad manufacturing method of the disclosure is a seat pad manufacturing method for manufacturing the seat pad,
the bag-contained pad part being manufactured through:
a bag body attaching step in which a to-be-held portion provided in the bag body is held in a holding portion provided in a mold, the bag body is positioned and attached to the mold;
an injecting step in which a foamable material is injected into the mold to which bag body is attached; and
a foaming step in which the foamable material in the mold is foamed, wherein
in the bag body attaching step, the bag body is constrained so that a volume of the bag body does not increase beyond a certain level.

Advantageous Effect

According to the disclosure, it is possible to provide a seat pad, a vehicle seat, a vehicle seat controlling method and a seat pad manufacturing method capable of changing both the vibration transmissibility and the sense of seating of a seat pad which is a component of the vehicle seat.

BRIEF DESCRIPTION OF THE DRAWINGS

In the accompanying drawings:

FIG. 1 is a perspective view illustrating a vehicle seat according to one embodiment of the disclosure;

FIG. 5 is a view illustrating an operation of the vehicle seat according to the embodiment of the disclosure;

FIG. 23D is a view illustrating a vehicle seat according to a seventh modification of the other embodiment of the disclosure;

FIG. 23E is a view illustrating a vehicle seat according to an eighth modification of the other embodiment of the disclosure;

FIG. 23F is a view illustrating a vehicle seat according to a ninth modification of the other embodiment of the disclosure;

FIG. 23G is a view illustrating a vehicle seat according to a tenth modification of the other embodiment of the disclosure.

DETAILED DESCRIPTION

Figure 2:
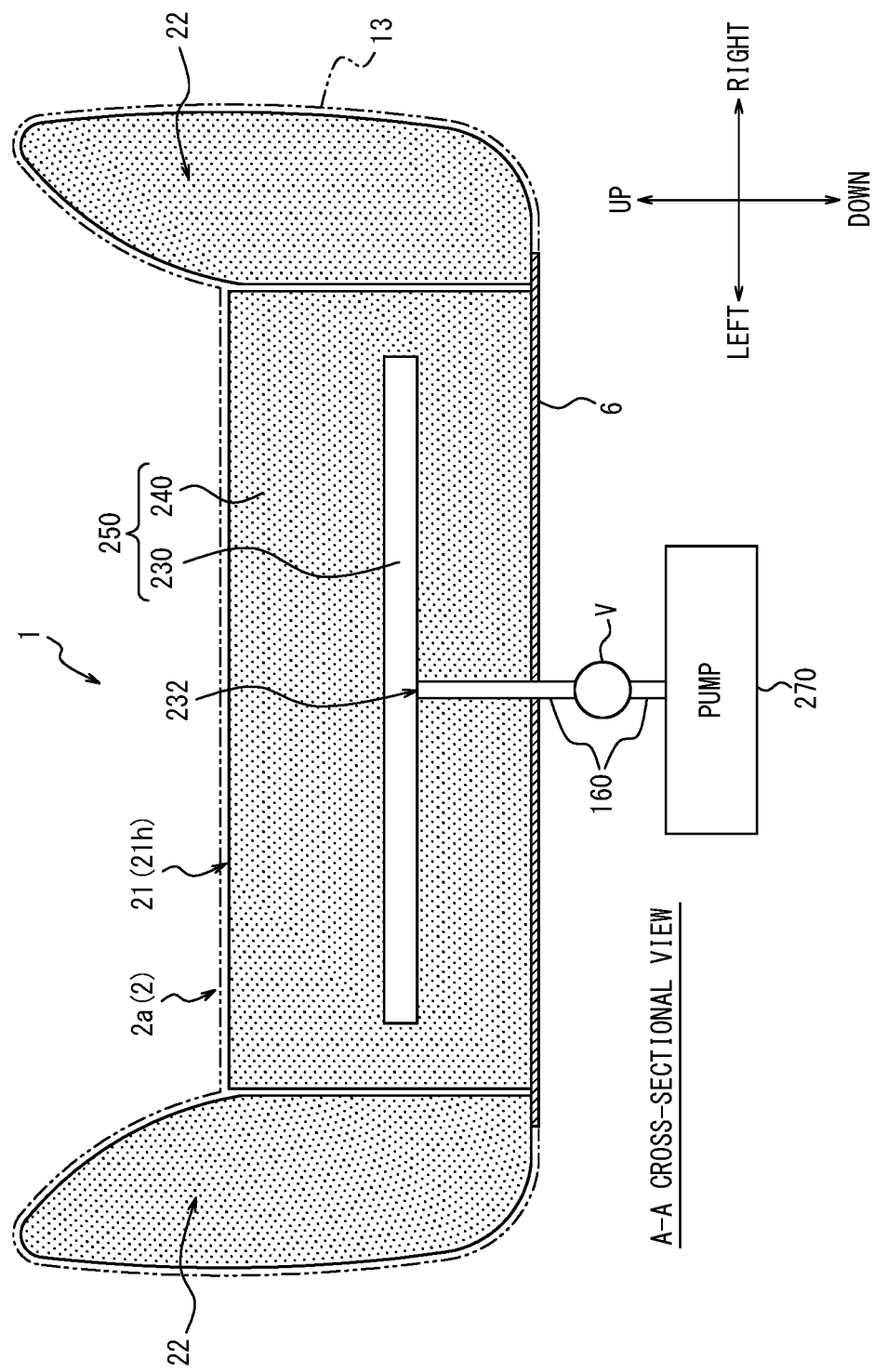
FIG. 2 is a vertical cross-sectional view taken along a line A-A of the vehicle seat in FIG. 1.

A seat pad, a vehicle seat, a vehicle seat controlling method, and a seat pad manufacturing method of the disclosure can be used for any type of vehicle, but, in particular, can be suitably used for passenger vehicles that are required to have high comfortability or large vehicles such as trucks, buses, and construction vehicles that bring about large vibrations.

First Embodiment

Embodiments of the seat pad, the vehicle seat, and the vehicle seat controlling method according to the disclosure will be described below with reference to the drawings. The same components in the drawings are denoted by the same reference numerals.

Vehicle seats according to examples (FIGS. 1 to 9) of the present embodiment all correspond to the vehicle seat according to the disclosure. Seat pads according to examples (FIGS. 1 to 9) of the present embodiment correspond to the seat pad according to the disclosure. A vehicle seat controlling method according to a first modification (FIG. 6) of the present embodiment corresponds to the vehicle seat controlling method of the disclosure.

FIG. 1 illustrates a vehicle seat 1 of the present embodiment. FIG. 2 is a vertical cross-sectional view taken along a line A-A of the vehicle seat 1 in FIG. 1. The vehicle seat 1 of the present embodiment includes a seat pad 2, a cover member 13 that covers a front side (occupant side) of the seat pad 2, a pan frame 6 that supports the seat pad 2 from below on a back side of the seat pad 2, a pump 270, and a first valve V. The seat pad 2 of the present example includes a cushion pad 2*a* on which an occupant sits and a back pad 2*b* configured to support the back of the occupant.

The cover member 13 is made of, for example, a material (cloth or the like) having good air permeability.

For convenience, the cover member 13 is indicated by a solid line and the seat pad 2 is indicated by a broken line in FIG. 1, but the cover member 13 is indicated by a broken line and the seat pad 2 is indicated by a solid line in FIG. 2.

In the description, as illustrated in each of the drawings, an "up" direction, a "down" direction, a "left" direction, a "right" direction, a "front" direction, and a "rear" direction when viewed from an occupant who sits on the vehicle seat 1 are simply referred to as an "up", a "down", a "left", a "right", a "front", and a "rear", respectively.

The cushion pad 2*a* of the seat pad 2 will be described below instead of the back pad 2*b*. Therefore, the cushion pad 2*a* may be simply referred to as "seat pad 2".

The cushion pad 2*a* of the seat pad 2 includes a main pad portion 21 configured such that buttocks and a femoral region of the occupant are placed and a pair of side pad portions 22 located on both left and right sides of the main pad portion 21. The main pad portion 21 includes a hip-placed part 21*h* configured such that the buttocks of the occupant are placed and a femoral region-placed part 21*t* located forward of the hip-placed part 21*h* and configured such that the femoral region of the occupant is placed.

The line A-A in FIG. 1 passes through the hip-placed part 21*h*.

In an example of FIG. 2, the main pad portion 21 is configured separately from the side pad portions 22.

However, the main pad portion 21 and the side pad portions 22 may be integrally configured (integrally molded) in part or in whole.

Figure 3:
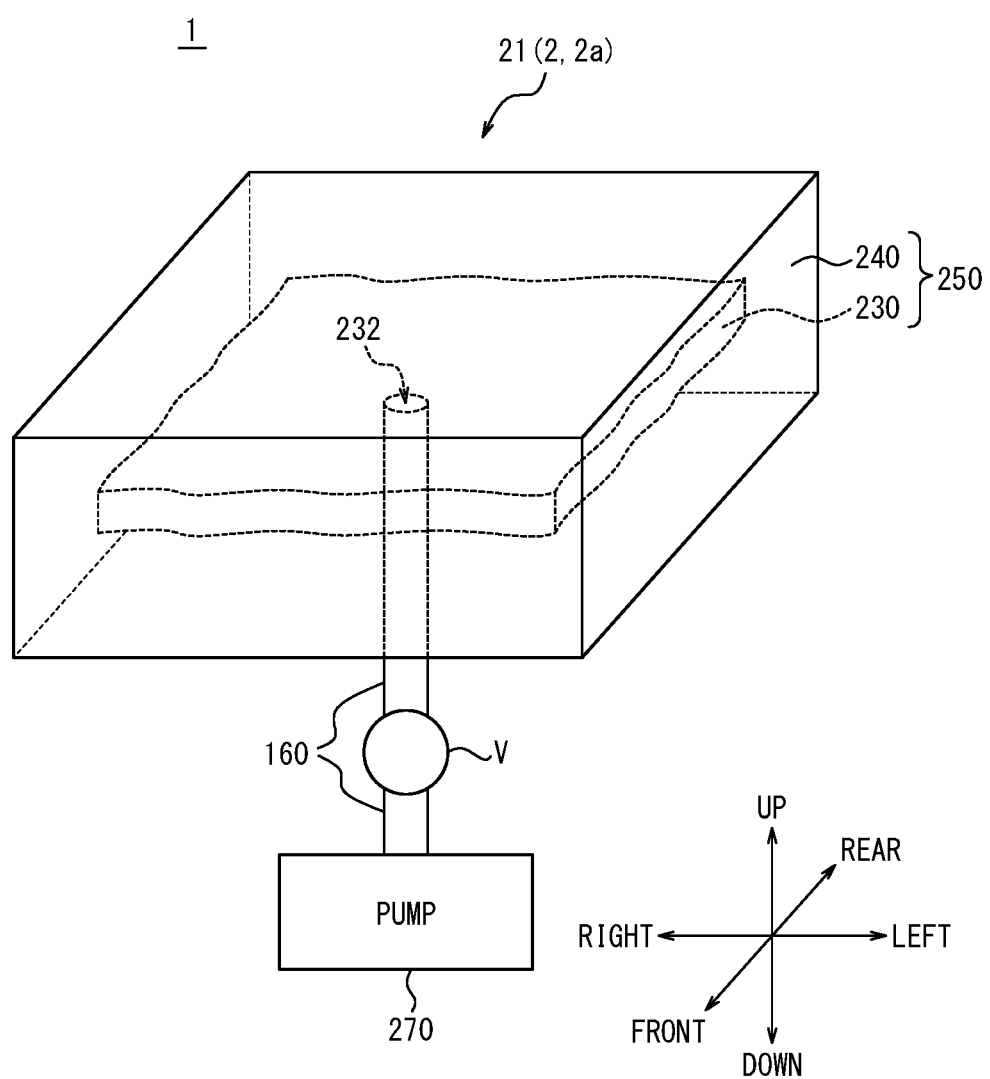
FIG. 3 is a perspective view illustrating a part of a seat pad in FIG. 2.

FIG. 3 illustrates only the main pad portion 21 of the seat pad 2 in FIG. 2, and also illustrates the pump 270 and the first valve V provided in the vehicle seat 1. In the example of FIGS. 2 and 3, the seat pad 2 includes a bag-contained pad part 250 as a component of the main pad portion 21. The bag-contained pad part 250 includes an outer foam body 240 (foam body) made of foam and a bag body 230 arranged inside the outer foam body 240.

A material forming parts other than the bag-contained pad part 250 of the seat pad 2 is preferably a foam, more preferably elastic resin foam, and particularly preferably polyurethane foam.

Similarly, as a material of the foam forming the outer foam body 240, elastic resin foam is preferable, and polyurethane foam is particularly preferable. The material of the foam forming the outer foam body 240 may be similar to or different from the material forming the parts other than the bag-contained pad part 250 of the seat pad 2.

The bag body 230 is made of a non-stretchable material. In the description, the "non-stretchable material" is not limited to a material not having stretchable property at all, and includes a material having a small stretchable property.

Specifically, the "non-stretchable material" forming the bag body 230 preferably has an elongation at 10 N, which is measured according to JIS K7161, of 8% or less and particularly of 6% or less.

Here, the "elongation at 10 N measured according to JIS K7161" means an elongation (tensile strain) (%) obtained by dividing the amount of increase in a distance between marked lines by the distance between the marked lines and multiplying the divided value by 100 when a tensile force of 10 N is applied to a test piece using an extensometer according to JIS K7161 except for dimensions and test conditions of a test piece to be described below. Here, an Autograph AGS-1 kN manufactured by Shimadzu Corporation is used as the extensometer. The test piece has a rectangular plate shape of 80 mm (length in a tensile direction)×40 mm×0.26 mm (thickness). A stroke and a load are reset in a chucked state to start the test under the test conditions that the distance between the marked lines before the tensile force is applied is 50 mm and a tensile speed is 10 mm/min.

Further, it is preferable that the material forming the bag body 230 is flexible and has no air permeability.

An example of the non-stretchable material forming the bag body 230 preferably includes a rubber material, a synthetic resin, polyvinyl chloride, or polyethylene terephthalate.

Figure 4A:
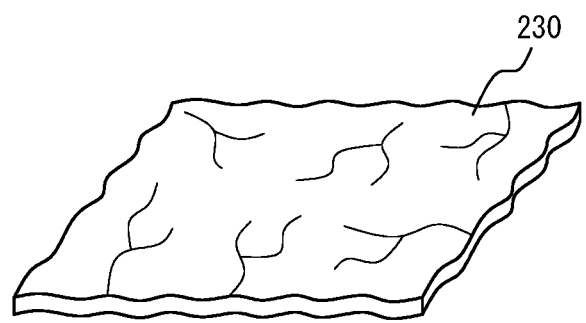
FIG. 4A is a perspective view illustrating a mode when a bag body in FIG. 3 is in a crushed state.
Figure 4B:
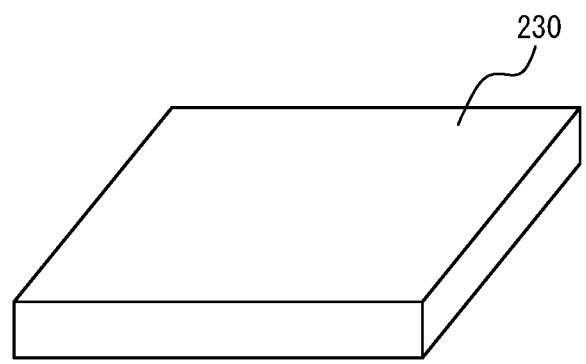
FIG. 4B is a perspective view illustrating a mode when the bag body is in an expanded state.

FIG. 4 illustrates only the bag body 230 in the example of FIGS. 2 and 3. Since the bag body 230 is made of the non-stretchable material as described above, an inner surface and an outer surface of the bag body 230 always have a substantially constant area irrespective of whether the bag body 230 is in a contracted state (FIG. 4A) or in an expanded state (FIG. 4B). In other words, when a fluid is supplied to the inside of the bag body 230 from a state where the fluid is not contained in the bag body 230 (FIG. 4A), the bag body 230 continues to expand until an internal volume of the bag body 230 reaches a predetermined maximum internal volume VMAX. However, after reaching the maximum internal volume VMAX, the bag body 230 hardly expands any more only by the rise of the internal pressure of the bag body 230, and a shape and a size of the bag body 230 are substantially or completely maintained (FIG. 4B).

In the present embodiment, air is used as the fluid supplied to the inside of the bag body 230, but it is preferable to use a liquid as an incompressibility fluid such as water or salt water, and it is particularly preferable to use a liquid consisting of various anti-freezing liquids, for example, a cooling liquid for a radiator, ethylene glycol, and silicon oil.

As illustrated in FIGS. 2 and 3, the pump 270 is connected to the bag body 230 such that the fluid can be supplied to the inside of the bag body 230. Thus, the fluid can be easily supplied to the inside of the bag body 230. In the present example, an outlet port (not illustrated) of the pump 270 is connected to an opening 232 of the bag body 230 through a pipe, so that the fluid can be supplied to the inside of the bag body 230 through the pipe 160 and the opening 232 by the pump 270. An inlet port (not illustrated) of the pump 270 is arranged outside the seat pad 2, for example.

Although the opening 232 of the bag body 230 is arranged on a bottom of the bag body 230 in the example of FIGS. 2 and 3, the opening 232 of the bag body 230 may be arranged on side surfaces or an upper surface of the bag body 230.

In the present example, the pump 270 is operated in a manual manner. However, the pump 270 may be controlled by a controller 15 to be described below.

The pump 270 may be provided to supply the fluid to the inside of the bag body 230 easily. However, the pump 270 may not be provided.

In the example of FIGS. 2 and 3, the first valve V is provided in the pipe 160 arranged between the opening 232 of the bag body 230 and the pump 270. In the present example, the first valve V is a check valve configured to allow only the passage of the fluid from the pump 270 toward the bag body 230. Thus, the first valve V is opened while the fluid is supplied from the pump 270 to the bag body 230, but the first valve V is switched from the open state to a closed state when the pump 270 is stopped. Therefore, the fluid can be prevented from coming out of the bag body 230, and thus the bag body 230 can be maintained in the expanded state.

In the present example, the first valve V, which is the check valve, may be configured to be capable of switching an activation and a release of a check function of allowing only the passage of the fluid from the pump 270 to the bag body 230. In this case, the switching of the check function of the first valve V may be manually operated, or may be controlled by a controller 15 to be described below. The activation and the release of the check function are switchable, whereby the check function can be activated, for example, when the occupant is seated or when the engine of the vehicle body is started, and the check function can be released and the first valve V can be opened when the engine is stopped.

The first valve V may be an on-off valve, which is configured to be capable of opening and closing a flow channel, instead of the check valve. In this case, it is preferable that the opening and closing of the first valve V is mechanically switched in cooperation with the operation of the pump 270 via a link mechanism or is switched in cooperation with the operation of the pump 270 by the controller 15 to be described below. In other words, the first valve V may be opened while the fluid is supplied from the pump 270 to the bag body 230, and the first valve V may be switched from the open state to the closed state when the pump 270 is stopped.

However, as in the present example, the check valve may be preferable as the first valve V because of non-requirement of the operation or the control.

As described above, since the vehicle seat 1 includes the first valve V in the present example, after once the fluid is supplied to the bag body 230, the first valve V is switched from the open state to the closed state as described above, whereby the fluid can be prevented from coming out of the bag body 230 and thus the bag body 230 can be maintained in the expanded state even when the pump 270 is not operated any more.

However, the vehicle seat 1 may not include the first valve V.

Any method may be used as a method of discharging the fluid supplied to the inside of the bag body 230 to contract the bag body 230.

For example, although not illustrated, a switching valve (a second valve) may be provided on the pipe 160 between the opening 232 of the bag body 230 and the first valve V to be switchable between a supply state where the opening 232 of the bag body 230 communicates with the first valve V and a discharge state where the opening 232 of the bag body 230 communicates with the fluid outlet port (for example, atmosphere opening port). In such a case, the switching valve (second valve) may be switched to the discharge state when the fluid inside the bag body 230 is discharged, and the switching valve (second valve) may be switched to the supply state in other cases. In this case, the switching of the second valve being the switching valve may be manually operated, or may be controlled by a controller 15 to be described below.

Alternatively, a discharging pipe is connected to the bag body 230 separately from the pipe 160 on the side of the pump 270, and the discharging pipe may be provided with an on-off valve (second valve) configured to open and close the flow channel. In such a case, the on-off valve (second valve) may be switched to the open state when the fluid inside the bag body 230 is discharged, and the on-off valve (second valve) may be switched to the closed state in other cases. In this case, the opening and closing of the second valve being the on-off valve may be manually operated, or may be controlled by a controller 15 to be described below.

Alternatively, when the first valve V includes a check valve or an on-off valve configured such that the activation and the release of the check function are switchable, the fluid inside the bag body 230 may be discharged through the inlet port of the stop pump 270 after the first valve V is switched to an open state. In this case, the switching of the first valve V may be manually operated, or may be controlled by a controller 15 to be described below.

An operation of the present embodiment will be described with reference to FIG. 5.

FIG. 5 is a view illustrating an operation of the examples of FIGS. 2 and 3. In the present example, as described above, the pump 270 is operated in a manual manner, and the first valve V is the check valve.

In FIG. 5A, the seat pad 2 is not applied with a load, the pump 270 is stopped, and the bag body 230 is in a contracted state. Thereafter, when the pump 270 is operated by an operator (for example, a person who is about to take a seat) (FIG. 5B), air is supplied to the inside of the bag body 230 from the pump 270. Accordingly, the bag body 230 gradually expands and the upper surface of the outer foam body 240 gradually rises. In the meantime, the first valve V is opened. Then, when the pump 270 is stopped, the first valve V is closed. Therefore, air is prevented from flowing out from the bag body 230 to the pump 270, and the expanded state of the bag body 230 is maintained. The operator operates the pump 270 to repeatedly supply the air to the bag body 230 while observing the rising state of the upper surface of the cushion pad 2a or to discharge the air from the bag body 230 using any method as described above, thereby appropriately adjusting the amount of air inside the bag body 230. Thereafter, when the occupant P sits on the seat pad 2 and the engine is started, vibration is applied to the vehicle body and the occupant P also vibrates up and down (FIG. 5C). In the meantime, the outer foam body 240 of the bag-contained pad part 250 repeatedly compresses and restores in the up-down direction, and the bag body 230 also vibrates inside the outer foam body 240 in the up-down direction. Thereafter, when the air inside the bag body 230 is discharged by any method as described above, the bag body 230 returns to the contracted state.

Effects of the present embodiment will be described below.

According to the present embodiment, first, it is possible to change vibration transmissibility (resonance magnification) of the cushion pad 2a of the seat pad.

In general, the vibration transmissibility of the cushion pad largely depends on damping performance of the cushion pad at the time of vibration excitation. In the present embodiment, the bag body 230 is arranged inside the outer foam body 240 to form the bag-contained pad part 250, so that air can be supplied to the inside of the bag body 230. Accordingly, the amount of air inside the bag body 230 changes, the movement of the bag body 230 itself and the interaction between the bag body 230 and the outer foam body 240 can change at the time of vibration excitation, the damping performance of the bag-contained pad part 250 can change at the time of vibration excitation, and as a result, the vibration transmissibility of the bag-contained pad part 250 and the cushion pad 2a can change. Specifically, when the amount of air inside the bag body 230 is increased, the vibration transmissibility of the bag-contained pad part 250 and the cushion pad 2a can be increased, and thus the cushion pad 2a comes to bounce more greatly at the time of vibration excitation (particularly, when vibration near a resonance frequency is input).

Further, according to the present embodiment, when the amount of air inside the bag body 230 of the bag-contained pad part 250 is changed, the vibration transmissibility and thus vibration waveform (dynamic waveform) of the seat pad can be changed, a compression deflection curve (static waveform), which is a characteristic when the cushion pad is compressed slowly, can also be changed. Thus, it is possible to change a sense of seating that the occupant feels when taking a seat. For example, it is possible to obtain a sense of seating that the occupant feels softer at first and feels harder later when taking a seat by adjustment of the amount of air inside the bag body 230.

As described above, according to the present embodiment, it is possible to change both the vibration transmissibility and the sense of seating of the seat pad 2 which is a component of the vehicle seat 1.

According to the method of adjusting the opening area of the ventilation window of the pan frame provided on the back side of the cushion pad of the seat pad as in PTL 1, the vibration transmissibility can be changed when the opening area of the ventilation window of the pan frame is changed as described above, but the compression deflection curve (static waveform) and the sense of seating can be hardly changed. The reason is because inflow and outflow of air at the ventilation window of the pan frame affects the cushion pad when the cushion pad is compressed quickly as in the case of vibration excitation, but does not affect the cushion pad when the cushion pad is compressed slowly as in the case of taking a seat.

Further, according to the present embodiment, when the amount of air inside the bag body 230 of the bag-contained pad part 250 is changed, the vibration transmissibility of the seat pad can be changed, but a resonance frequency of the seat pad can be hardly changed.

As described above, according to the present embodiment, it is possible to change the vibration transmissibility of the seat pad 2 independently without substantially changing the resonance frequency of the seat pad 2 of the vehicle seat 1. Therefore, the vibration transmissibility of the seat pad 2 can be easily adjusted. For example, it is possible to independently adjust the resonance frequency using another method while adjusting the vibration transmissibility using the method of the present embodiment.

In the present embodiment, since the bag body 230 is made of the non-stretchable material, there is also an advantage that the internal pressure of the bag body 230 can be easily managed.

If the bag body 230 is made of a material having a stretchable property, the bag body 230 may continue to expand and then rupture while the fluid is supplied to the inside of the bag body 230.

In the present embodiment, since the bag body 230 is made of the non-stretchable material, the bag body 230 continues to expand until the internal volume of the bag body 230 reaches the maximum internal volume VMAX described above while the fluid is supplied to the inside of the bag body 230. However, after reaching the maximum internal volume, the bag body 230 does not expand any more, and is greatly increased in the internal pressure, whereby a new fluid is hardly supplied. Therefore, since the maximum filling-up of the bag body 230 is easily grasped, the rupture of the bag body 230 is easily avoided.

It is important that the bag body 230 is arranged inside the outer foam body 240 as in the present embodiment, in other words, the outer foam body 240 covers almost the entire outer surface of the bag body 230. When the bag body 230 is not provided inside the outer foam body 240 and is simply attached to the bottom or the upper surface of the outer foam body 240, the bag body 230 hardly affects the operation of the outer foam body 240 even when the amount of air inside the bag body 230 is changed. Therefore, the vibration transmissibility and the sense of seating hardly change.

The outer foam body 240 and the bag body 230, which are components of the bag-contained pad part 250, are preferably molded integrally. In other words, during injection molding of the outer foam body 240, it is preferable that the outer foam body 240 be molded by injecting a molten resin into a mold in a state where the bag body 230 is inserted into the mold.

Thereby, even when the outer foam body 240 and the bag body 230 move at the time of vibration or when the occupant takes a seat, the outer foam body 240 can be effectively maintained in a state of being in close contact with the periphery of the bag body 230. Therefore, the vibration transmissibility and the sense of seating can be changed more effectively.

When the bag-contained pad part 250 is configured in such a manner that a notch is formed in the outer foam body 240 previously formed alone and the bag body 230 is accommodated in the notch, a gap may be generated between the outer foam body 240 and the bag body 230 while the outer foam body 240 and the bag body 230 move at the time of vibration or when the occupant takes a seat. Therefore, the vibration transmissibility and the sense of seating can hardly be changed very effectively.

Figure 6:
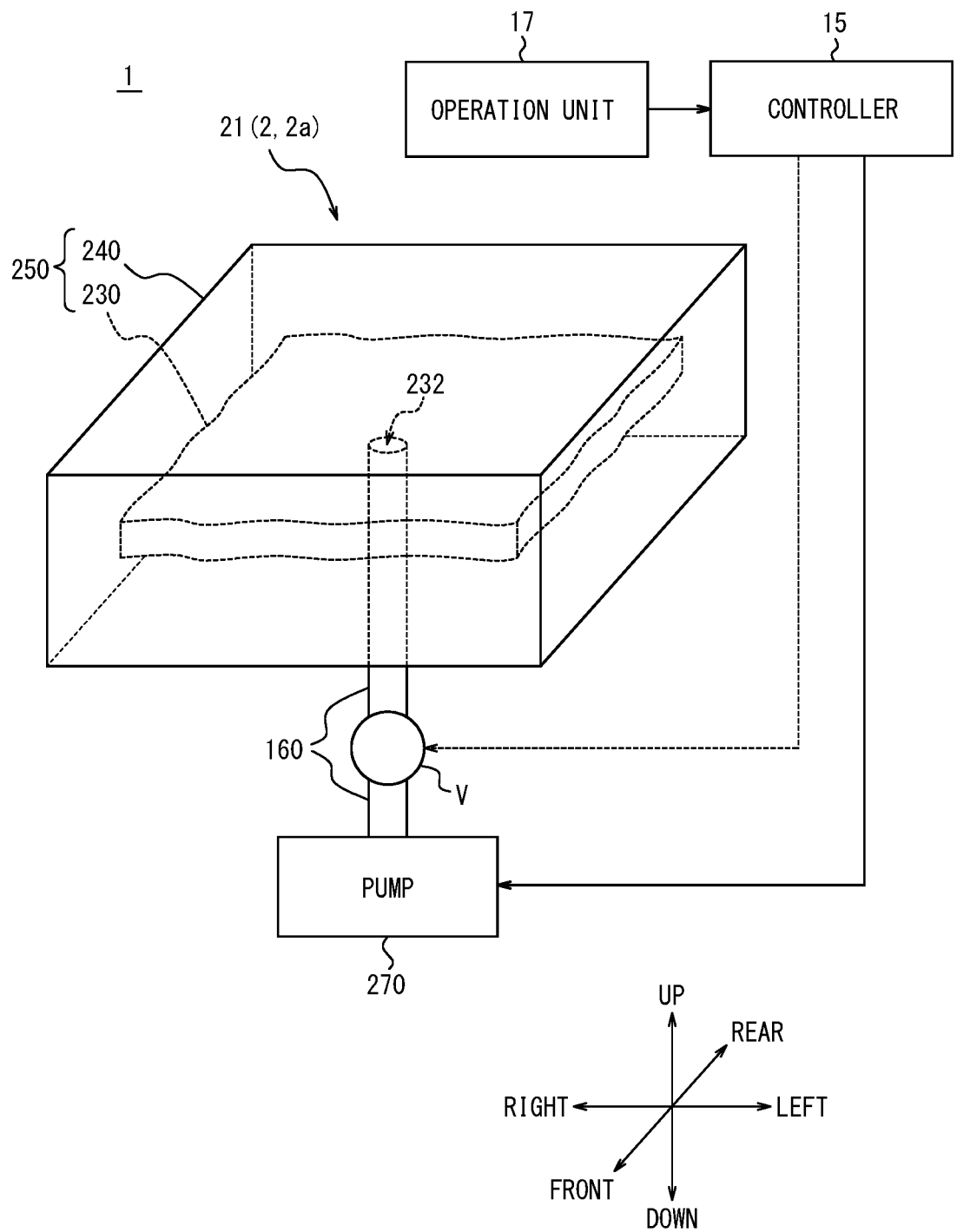
FIG. 6 is a view illustrating a vehicle seat according to a first modification of the embodiment of the disclosure.

FIG. 6 is a view corresponding to FIG. 3 and illustrates a first modification of the vehicle seat 1.

An example of FIG. 6 is different from the example of FIG. 3 in that the vehicle seat 1 further includes an operation unit 17 that receives a manual operation of the operator and a controller 15.

The controller 15 is configured to control the start (ON) and the stop (OFF) of the pump 270 according to a signal from the outside. An example of the "signal from the outside" includes any signal of a signal output from the operation unit 17 when the operation unit 17 is manually operated, a signal output from a sensor on a side of the engine, and/or a signal output from a sensor on a side of the pump 270 when a sensor such as a pressure sensor is provided on the side of the pump 270.

The controller 15 includes a control device such as an ECU (Engine Control Unit) or a CPU (Central Processing Unit). The controller 15 may be arranged outside or inside the pump 270.

The controller 15 may be configured to control a supply pressure of the pump 270 according to the signal from the outside (the signal output from the operation unit 17, the signal output from the sensor on the side of the engine, and the signal output from the sensor on the side of the pump 270).

Further, the controller 15 may also be configured to control the switching of the first valve V according to the signal from the outside (the signal output from the operation unit 17, the signal output from the sensor on the side of the engine, and the signal output from the sensor on the side of the pump 270).

In addition, when the vehicle seat 1 includes the above-described second valve (not illustrated) for discharging, the controller 15 can also be configured to control the switching of the second valve according to the signal from the outside (the signal output from the operation unit 17, the signal output from the sensor on the side of the engine, and the signal output from the sensor on the side of the pump 270).

According to the present example, since the operator can operate the pump 270 via the controller 15, the amount of fluid inside the bag body 230 can be easily adjusted. Further, the operator can easily operate the pump 270.

The vehicle seat 1 of the present embodiment is not limited to the case where the overall configuration of the main pad portion 21 of the seat pad 2 is configured by one bag-contained pad part 250 as in the example of FIG. 2. The main pad portion 21 of the seat pad 2 may include a plurality of bag-contained pad parts 250. In addition, a part in the up-down direction and/or a horizontal direction of the main pad portion 21 may be configured by the bag-contained pad part 250, and the other part may be configured by a general foam body that does not include the bag body 230. Further, not only the main pad portion 21 of the seat pad 2 but also a part or all of the side pad portion 22 may be configured by one or a plurality of bag-contained pad parts 250. Further, when the cushion pad 2a is viewed in a planar view (when viewed from above), the plurality of bag-contained pad parts 250 may be arranged at different positions (for example, different positions in a front-rear direction or a left-right direction).

Figure 7:
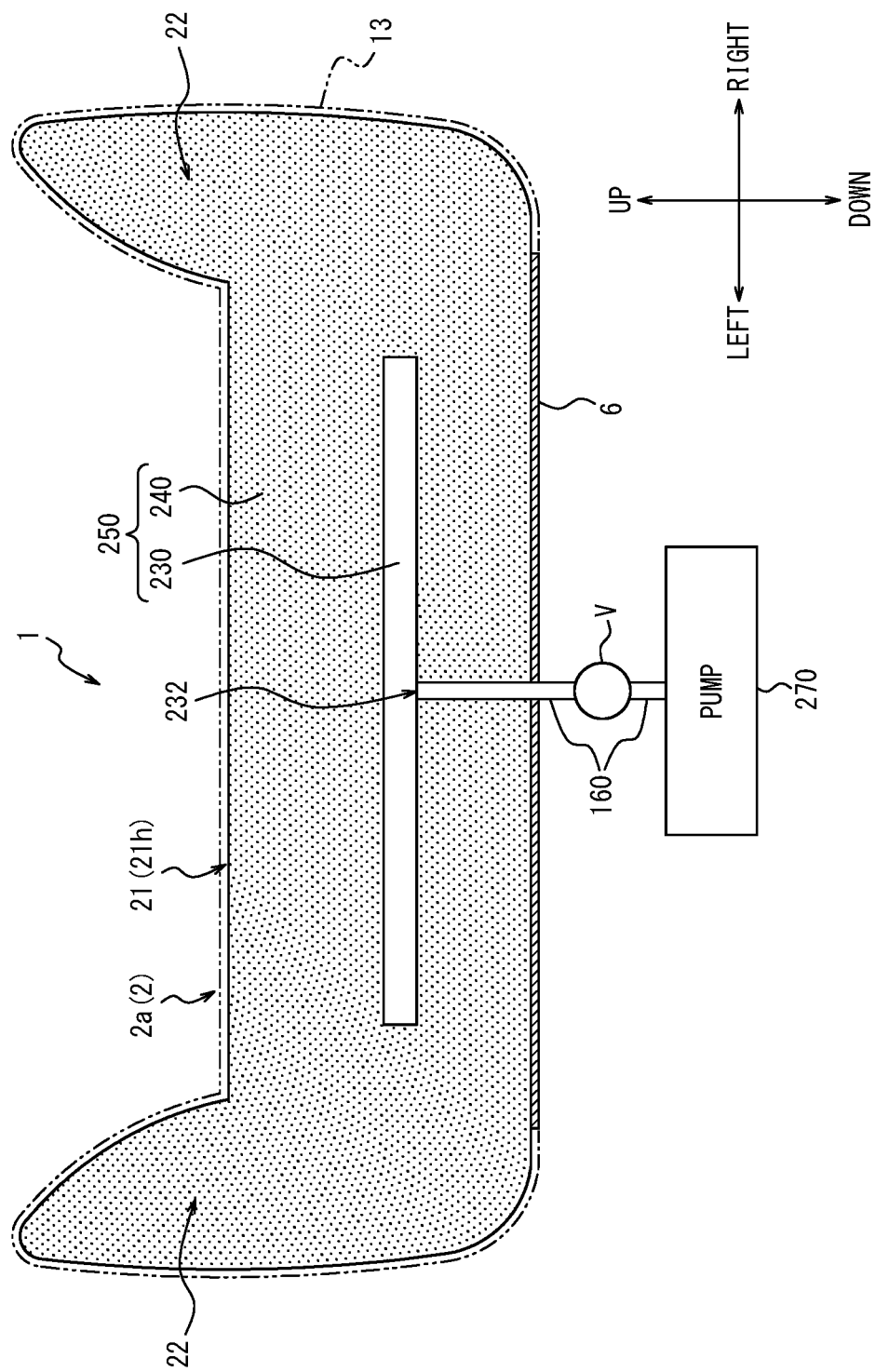
FIG. 7 is a view illustrating a vehicle seat according to a second modification of the embodiment of the disclosure.
Figure 8:
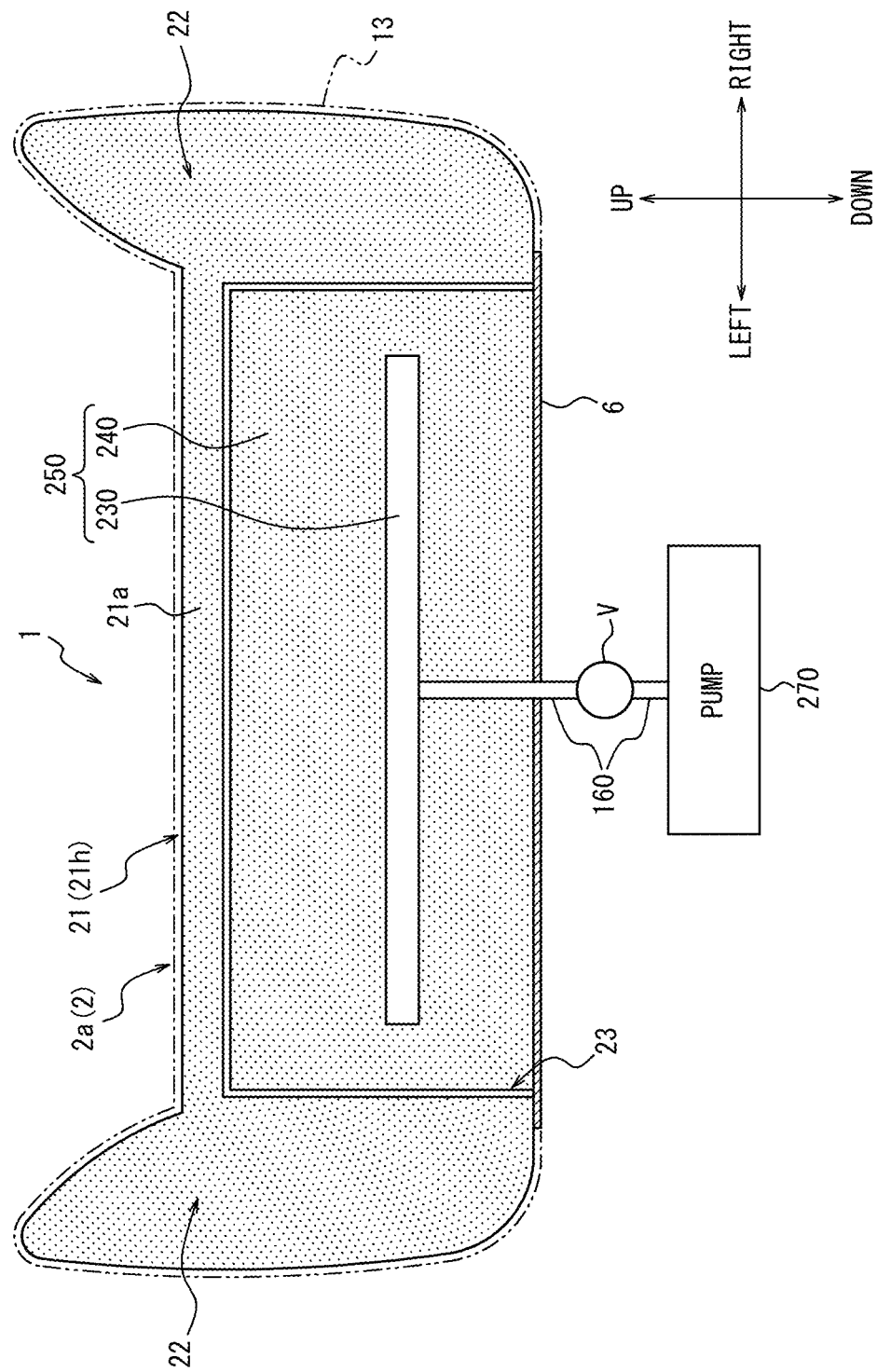
FIG. 8 is a view illustrating a vehicle seat according to a third modification of the embodiment of the disclosure.
Figure 9:
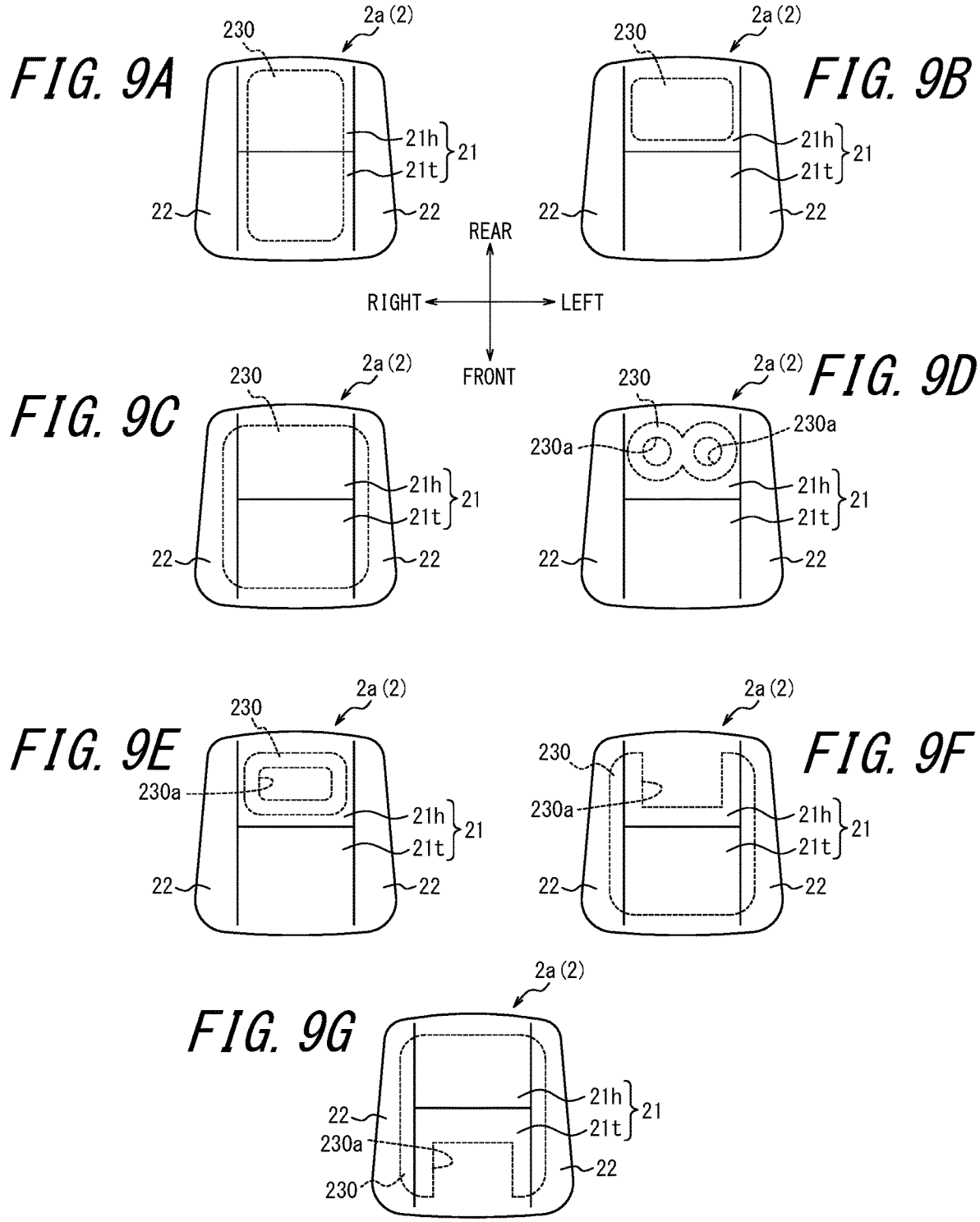
FIGS. 9A to 9G are views illustrating vehicle seats according to fourth to tenth modifications of the embodiment of the disclosure, respectively.

FIGS. 7 and 8 illustrate a second modification and a third modification, respectively, and are views corresponding to FIG. 2.

In respective examples in the description, the main pad portion 21 may be configured integrally with the pair of left and right side pad portions 22 as in the second modification illustrated in FIG. 7. In this case, the bag-contained pad part 250 is a component of the entire cushion pad 2a, and the outer foam body 240 includes both a foam body as a component of the main pad portion 21 and a foam body as a component of the pair of side pad portions 22.

Alternatively, in respective examples in the description, the main pad portion 21 includes the bag-contained pad part 250 and a covering part 21a that covers an upper side of the bag-contained pad part 250 as in the third modification illustrated in FIG. 8, and the covering part 21a of the main pad portion 21 may be configured integrally with the pair of left and right side pad portions 22. In this case, the bag-contained pad part 250 is accommodated from the back side into a recess 23 defined by the covering part 21a of the main pad portion 21 and the pair of side pad portions 22 on the back side of the cushion pad 2a of the seat pad 2 when the seat pad is manufactured.

At least a part of the bag body 230 is preferably located directly under a portion of the upper surface, onto which a load is applied from the occupant, of the cushion pad 2a.

Specifically, at least a part of the bag body 230 is preferably arranged inside the main pad portion 21 (hip-placed part 21h and/or femoral region-placed part 21t) of the cushion pad 2a, and particularly, is preferably arranged inside the hip-placed part 21h of the main pad portion 21.

Thus, the vibration transmissibility and the sense of seating can be changed more effectively.

From the same viewpoint, the entire bag body 230 is preferably arranged inside the main pad portion 21 of the cushion pad 2a as in the example of FIG. 2.

In the examples of FIGS. 2 to 4, the bag body 230 has a substantially rectangular parallelepiped shape, which is a substantially square shape when viewed from above, in the expanded state. However, the bag body 230 may have any three-dimensional shape in the expanded state.

When the maximum internal volume VMAX of the bag body 230 is considered to be constant, it is possible to obtain almost the same as the above-described effect (the vibration transmissibility and the sense of seating can be changed) even when the shape of the bag body 230 is changed in the expanded state.

The arrangement position in the thickness direction (up-down direction) of the bag body 230 in the outer foam body 240 is not limited to a substantially central position in the thickness direction in the outer foam body 240 as illustrated in FIG. 2, and may be a position that deviates to the upper surface side or the bottom surface side in the thickness direction in the outer foam body 240.

When the thickness of the outer foam body 240 and the maximum internal volume VMAX of the bag body 230 are considered to be constant, it is possible to obtain almost the same as the above-described effect (the vibration transmissibility and the sense of seating can be changed) even when the arrangement position in the thickness direction (up-down direction) of the bag body 230 in the outer foam body 240 is changed.

FIGS. 9A to 9G illustrate states of the cushion pad 2a as viewed from above in fourth to tenth modifications, respectively, and illustrate the shape and arrangement in the expanded state of the bag body 230 as viewed from above.

In an example of FIG. 9A, the bag body 230 has a substantially rectangular shape that is long in the front-rear direction as viewed from above. The bag body 230 is arranged only inside the main pad portion 21 and extends in the front-rear direction over both the hip-placed part 21h and the femoral region-placed part 21t of the main pad portion 21.

In an example of FIG. 9B, the bag body 230 has a substantially rectangular shape that is long in the left-right direction as viewed from above. The bag body 230 is arranged only inside the hip-placed part 21h of the main pad portion 21.

In an example of FIG. 9C, the bag body 230 has a substantially square shape as viewed from above. The bag body 230 is arranged over the entire cushion pad 2a including not only the main pad portion 21 but also the side pad portion 22.

In an example of FIG. 9D, the bag body 230 has a figure-eight shape as viewed from above. The bag body 230 includes two recesses 230a on left and right sides, each of the recesses including a vertical through-hole or a hollow that is dented downward. The bag body 230 is arranged only inside the hip-placed part 21h of the main pad portion 21. According to the present example, since a pair of hipbones of the occupant are accommodated in the two recesses 230a when the occupant takes a seat, a sitting comfort of the occupant can be improved and the posture of the occupant can also be improved.

In an example of FIG. 9E, the bag body 230 has an annular shape as viewed from above. The bag body 230 includes one recess 230a, the recess including a vertical through-hole or a hollow that is dented downward. The bag body 230 is arranged only inside the hip-placed part 21h of the main pad portion 21. According to the present example, since a pair of hipbones of the occupant are accommodated in the recess 230a when the occupant takes a seat, a sitting comfort of the occupant can be improved and the posture of the occupant can also be improved.

In an example of FIG. 9F, the bag body 230 has a U shape as viewed from above. The bag body 230 includes one recess 230a, the recess including a vertical through-hole or a hollow that is dented downward. The recess 230a is arranged in a rear part of the bag body 230 and a rear end of the recess is opened. The bag body 230 is arranged over the entire cushion pad 2a including not only the main pad portion 21 but also the side pad portion 22. According to the present example, since a pair of hipbones of the occupant are accommodated in the recess 230a when the occupant takes a seat, a sitting comfort of the occupant can be improved and the posture of the occupant can also be improved.

In an example of FIG. 9G, the bag body 230 has a U shape (may also be referred to as an inverted U shape compared with the example of FIG. 9F) as viewed from above. The bag body 230 includes one recess 230a, the recess including a vertical through-hole or a hollow that is dented downward. The recess 230a is arranged in a front part of the bag body 230 and a front end of the recess is opened. The bag body 230 is arranged over the entire cushion pad 2a including not only the main pad portion 21 but also the side pad portion 22. Even in the present example, a sitting comfort of the occupant can be improved and the posture of the occupant can also be improved.

EXAMPLES AND COMPARATIVE EXAMPLES

Examples and comparative examples of the vehicle seat of the disclosure will be described below with reference to FIGS. 10 to 12.

Example 1

Figure 10:
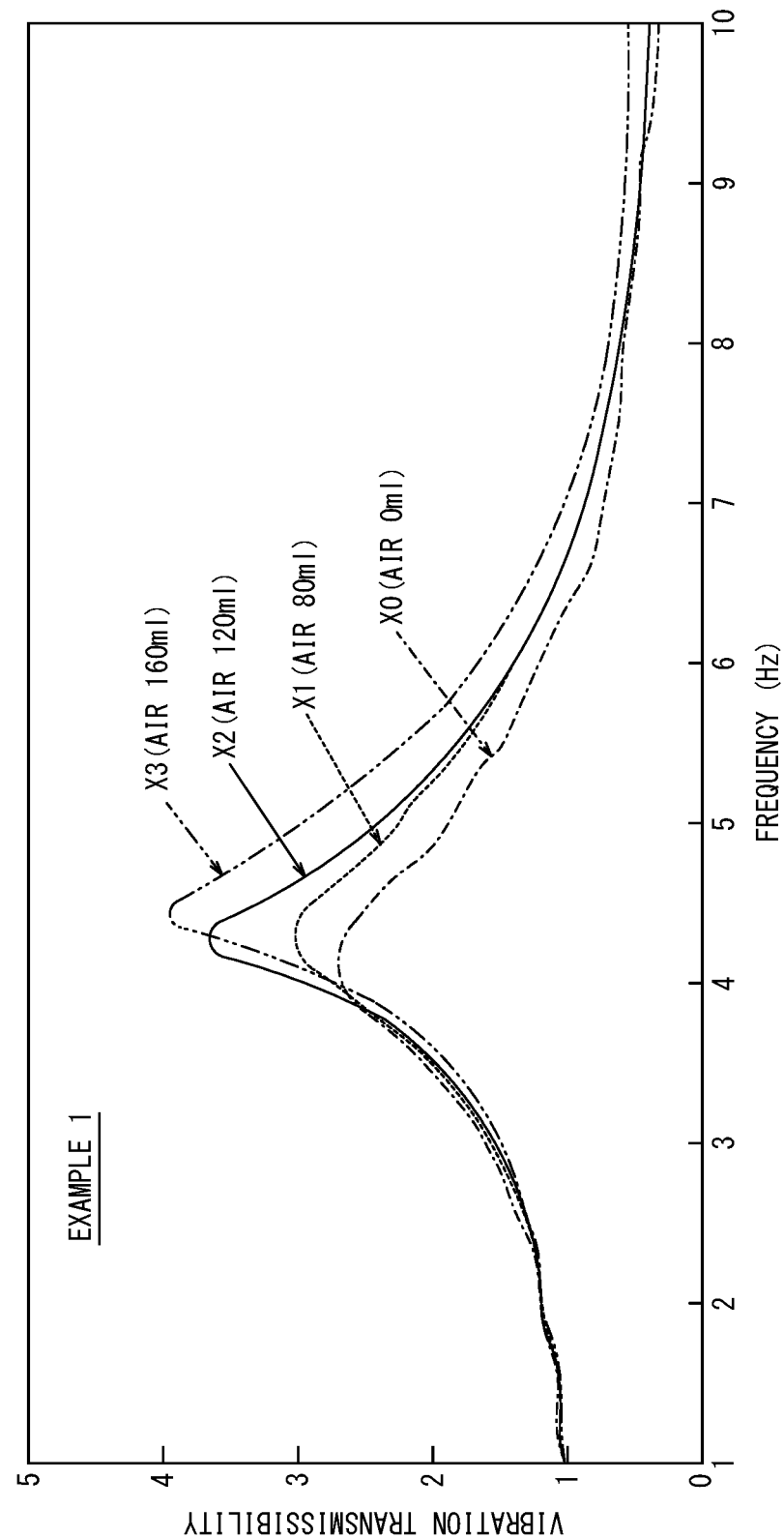
FIG. 10 is a view illustrating a dynamic waveform obtained as a result of performing an experiment in Example 1 of the vehicle seat of the disclosure.

FIG. 10 illustrates a vibration waveform (dynamic waveform) obtained as a result of performing a vibration experiment of the seat pad in Example 1 of the disclosure. FIG. 11 illustrates a compression deflection curve (static waveform) obtained as a result of performing a compression deflection experiment of the seat pad in Example 1 of the disclosure.

As illustrated in FIG. 3, a test specimen in Example 1 was assumed as the main pad portion 21 of the cushion pad 2a to prepare the bag-contained pad part 250, and the pump 270 and the first valve V were connected to the bag-contained pad part 250. The bag-contained pad part 250 was formed by integrally molding the outer foam body 240 and the bag body 230. The outer foam body 240 of the bag-contained pad part 250 was made of polyurethane foam. The dimension of the bag-contained pad part 250 (dimension of the outer foam body 240) in a state where the bag body 230 was crushed was 400 mm×400 mm×100 mm. The bag body 230 was arranged substantially at the center of the outer foam body 240 in the up-down direction, the left-right direction, and the front-rear direction. The bag body 230 of the bag-contained pad part 250 was made of a rubber material. The opening 232 of the bag body 230 was arranged on the side surface of the bag body 230. In addition, the opening 232 of the bag body 230 was connected to the outlet port of the pump 270 by the pipe 160. The pump 270 was operated in a manual manner. The first valve V was a check valve. The second valve for discharging was provided in the pipe 160 between the pump 270 and the first valve V.

In a vibration test of Example 1, after the amount of air inside the bag body 230 of the test specimen was adjusting in advance by the operation of the pump 270 and the second valve, the test specimen was placed on a receiving tool assumed as the pan frame 6. Then, assuming that an occupant of 50 kg was seated, a pressing element made of an iron press plate of 50 kg was placed from above. In such a state, when the amounts of air inside the bag body 230 are 0 ml, 80 ml, 120 ml, and 160 ml, respectively, the vibration tests were performed at a frequency of 1 to 10 Hz and a sweep time of 5 minutes. The results are illustrated in FIG. 10.

In the compression deflection experiment of Example 1, when the amounts of air inside the bag body 230 are 0 ml, 80 ml, and 120 ml, respectively, the compression deflection experiments were performed. The results are illustrated in FIG. 11.

In the vibration waveform illustrated in FIG. 10, a horizontal axis indicates a frequency (Hz), and a vertical axis indicates vibration transmissibility.

As can be seen from FIG. 10 in which a waveform is X0 when the amount of air inside the bag body 230 is 0 ml, a waveform is X1 when the amount of air is 80 ml, a waveform is X2 when the amount of air is 120 ml, and a waveform is X3 when the amount of air is 160 ml, as the amount of air inside the bag body 230 increases, the vibration transmissibility greatly increases, but the resonance frequency only slightly increases. Specifically, comparing the waveform X0 when the amount of air is 0 ml which is the smallest amount of air with the waveform X3 when the amount of air is 160 ml which is the largest amount of air, the vibration transmissibility when the amount of air is 160 ml is more increased by 1.23 than the vibration transmissibility when the amount of air is 0 ml, whereas the resonance frequency is increased only by 0.3 Hz.

As described above, according to Example 1, it is possible to solely adjust only the vibration transmissibility by the adjustment of the amount of air inside the bag body 230.

Figure 11:
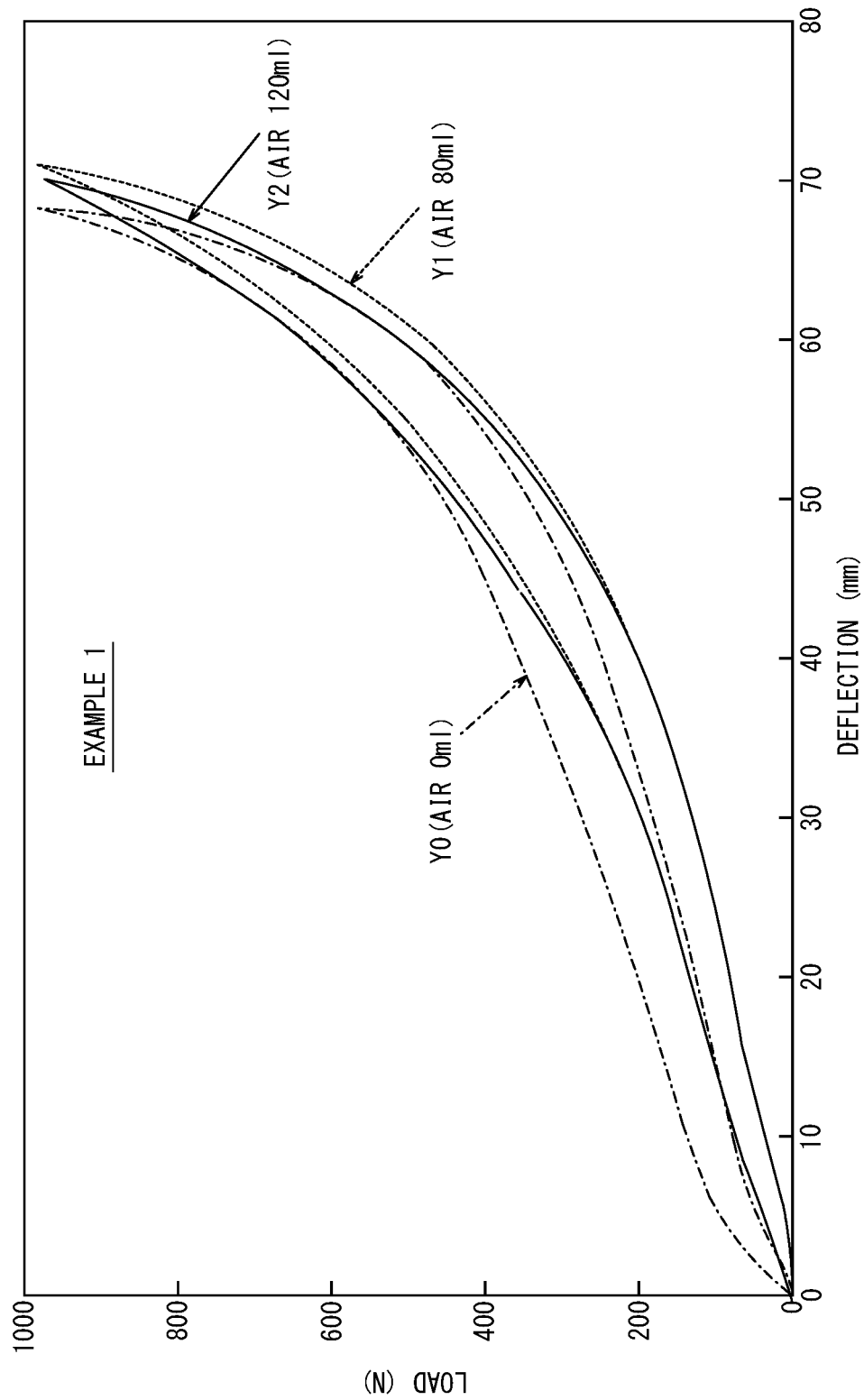
FIG. 11 is a view illustrating a static waveform obtained as a result of performing an experiment in Example 1 of the vehicle seat of the disclosure.

In the compression deflection curve illustrated in FIG. 11, a horizontal axis indicates a deflection (mm), and a vertical axis indicates a load (N).

As can be seen from FIG. 11 in which waveforms are Y0, Y1, and Y2 when the amount of air inside the bag body 230 is 0 ml, a waveform is Y1 when the amount of air is 80 ml, and a waveform is Y2 when the amount of air is 120 ml, as the amount of air inside the bag body 230 increases, the compression deflection curves (static waveform) also change.

As described above, according to Example 1, it is possible to adjust not only the compression deflection curve (static waveform) but also the sense of seating by the adjustment of the amount of air inside the bag body 230.

Comparative Examples 1 and 2

Figure 12:
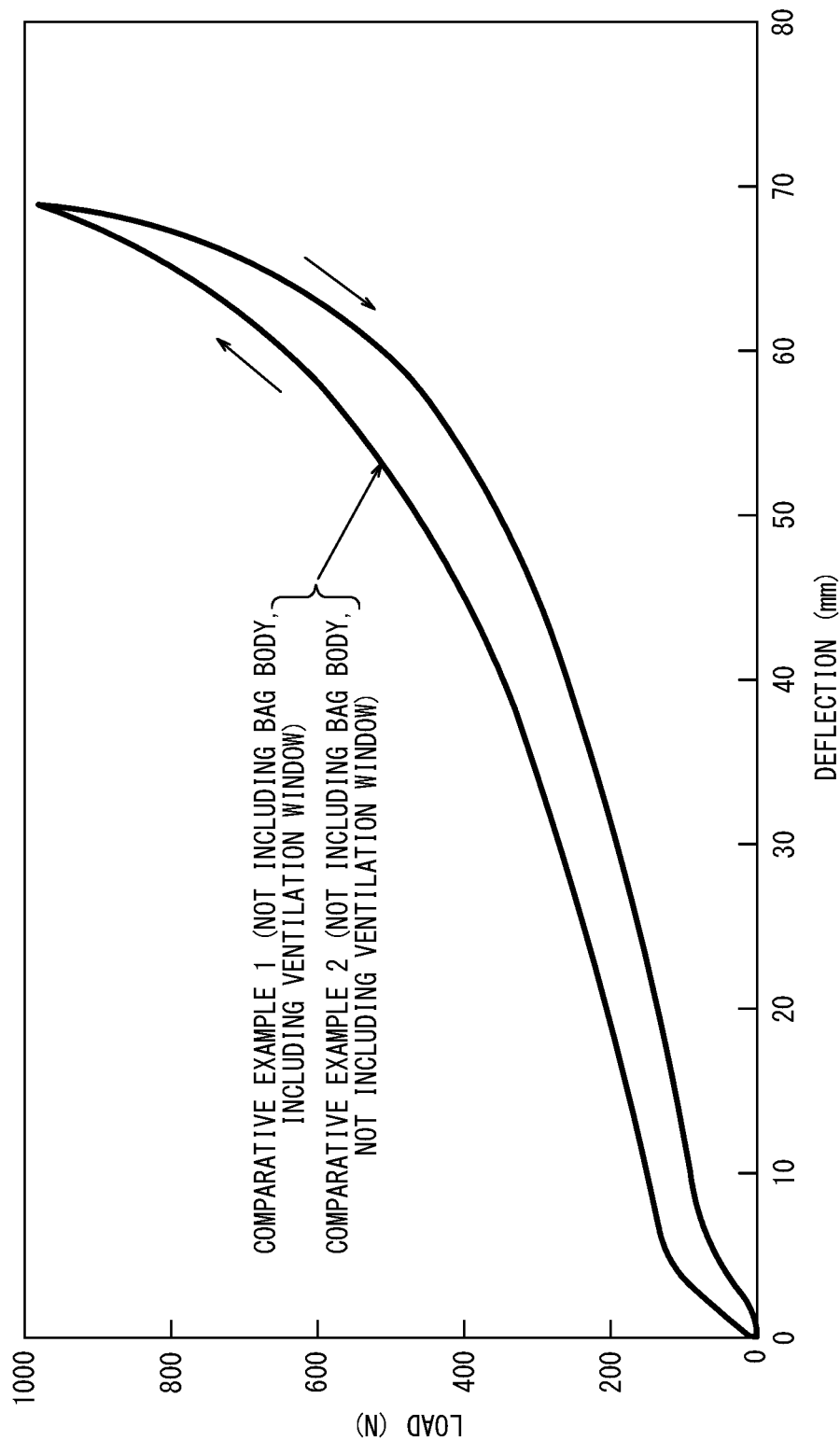
FIG. 12 is a view illustrating a static waveform obtained as a result of performing an experiment in Comparative Examples 1 and 2 of the vehicle seat of the disclosure.

FIG. 12 illustrates results of a compression deflection experiment in Comparative Examples 1 and 2 of the seat pad of the disclosure.

Test specimens of Comparative Examples 1 and 2 were provided with a foam body and a pan frame that supports the foam body from below. The foam body forming the test specimens of Comparative Examples 1 and 2 did not include the bag body 230, was made of polyurethane foam, and had a dimension of 400 mm×400 mm×100 mm. A composition of the polyurethane foam of the foam body in Comparative Example 1 was similar to that in Comparative Example 2. The pan frame was provided with a ventilation window in Comparative Example 1, but the pan frame was not provided with a ventilation window in Comparative Example 2.

In the compression deflection curve illustrated in FIG. 12, a horizontal axis indicates a deflection (mm), and a vertical axis indicates a load (N).

As illustrated in FIG. 12, the compression deflection curve (static waveform) did not change at all in Comparative Examples 1 and 2.

As can be seen from the results in FIG. 12, even when an opening area of the ventilation window of the pan frame is changed, not only the compression deflection curve (static waveform) but also the sense of seating can hardly be changed.

Second Embodiment

An embodiment different from the first embodiment of the seat pad and the vehicle seat of according to the disclosure, and an embodiment of a seat pad manufacturing method will be described below with reference to the drawings. The same components in the drawings are denoted by the same reference numerals.

Vehicle seats according to examples of the present embodiment all correspond to the vehicle seat according to the disclosure. Seat pads according to examples of the present embodiment correspond to the seat pad according to the disclosure.

Figure 13:
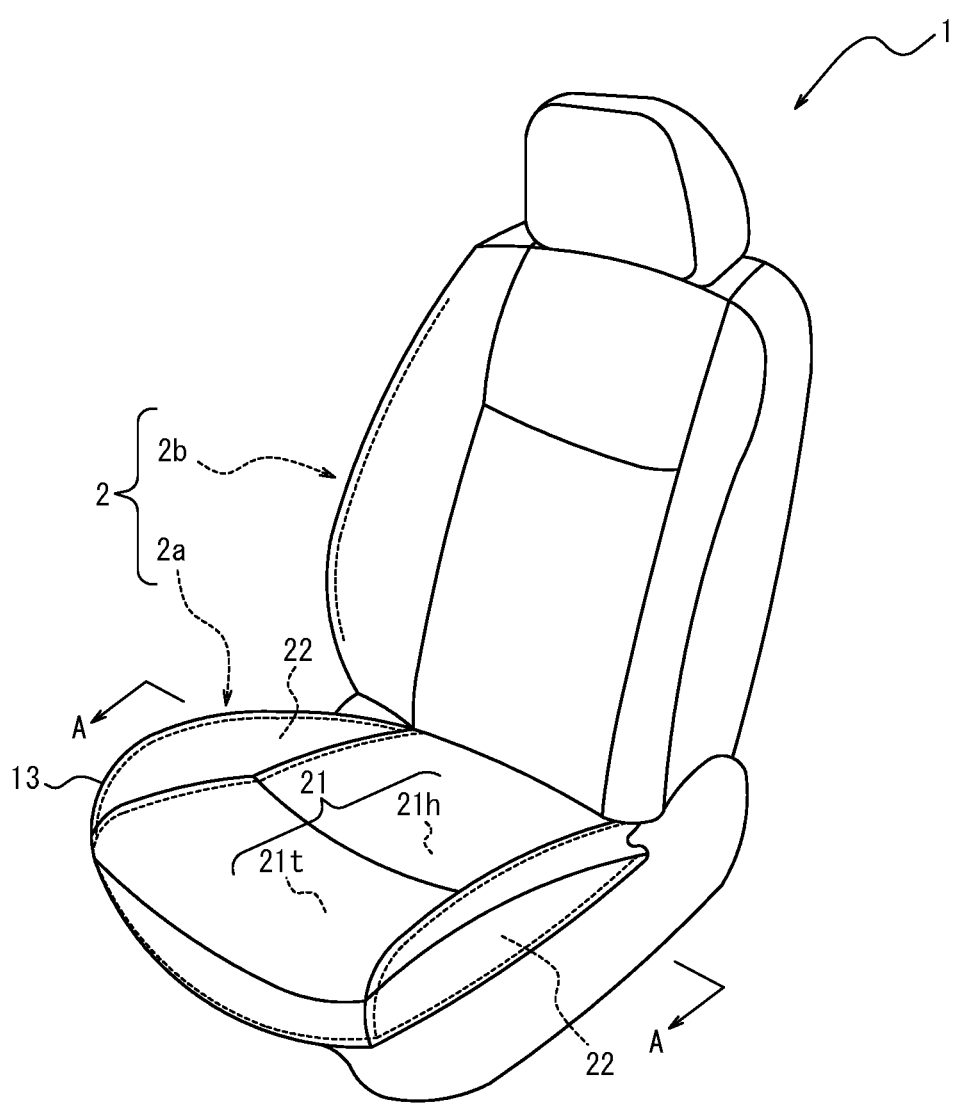
FIG. 13 is a perspective view illustrating a vehicle seat according to the other embodiment of the disclosure.
Figure 14:
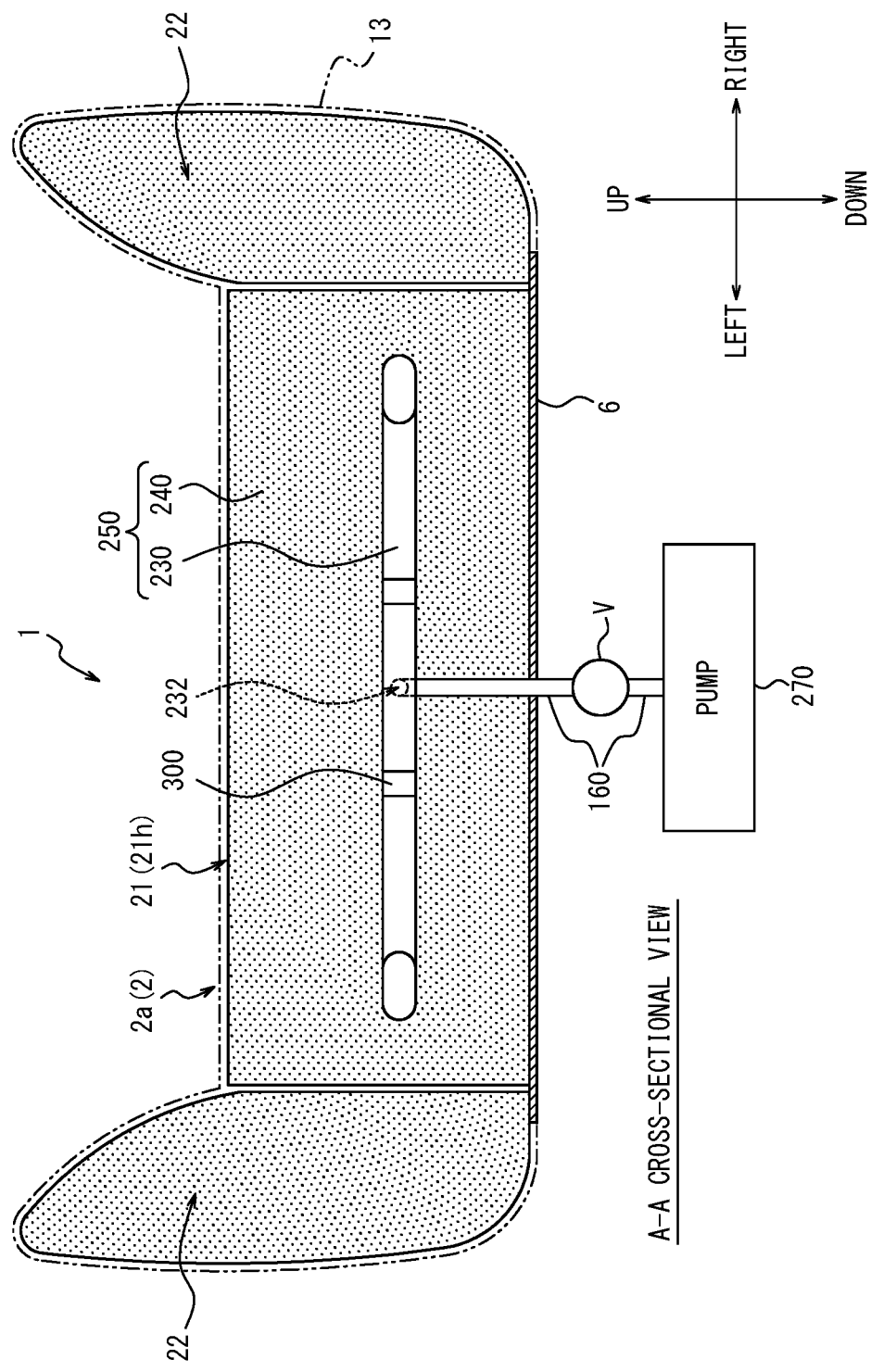
FIG. 14 is a vertical cross-sectional view taken along a line A-A of the vehicle seat in FIG. 13.

FIG. 13 illustrates a vehicle seat 1 of the present embodiment. FIG. 14 is a vertical cross-sectional view taken along a line A-A of the vehicle seat 1 in FIG. 13. The vehicle seat 1 of the present embodiment includes a seat pad 2 of the present embodiment, a cover member 13 that covers a front side (occupant side) of the seat pad 2, a pan frame 6 that supports the seat pad 2 from below on a back side of the seat pad 2, a pump 270, and a first valve V. The seat pad 2 of the present example includes a cushion pad 2a on which an occupant sits and a back pad 2b configured to support the back of the occupant.

The cover member 13 is made of, for example, a material (cloth or the like) having good air permeability.

For convenience, the cover member 13 is indicated by a solid line and the seat pad 2 is indicated by a broken line in FIG. 13, but the cover member 13 is indicated by a broken line and the seat pad 2 is indicated by a solid line in FIG. 14.

In the description, as illustrated in each of the drawings, an "up" direction, a "down" direction, a "left" direction, a "right" direction, a "front" direction, and a "rear" direction when viewed from an occupant who sits on the vehicle seat 1 are simply referred to as an "up", a "down", a "left", a "right", a "front", and a "rear", respectively.

The cushion pad 2a of the seat pad 2 will be described below instead of the back pad 2b. Therefore, the cushion pad 2a may be simply referred to as "seat pad 2".

The cushion pad 2a of the seat pad 2 of the present embodiment includes a main pad portion 21 configured such that buttocks and a femoral region of the occupant are placed and a pair of side pad portions 22 located on both left and right sides of the main pad portion 21. The main pad portion 21 includes a hip-placed part 21h configured such that the buttocks of the occupant are placed and a femoral region-placed part 21t located forward of the hip-placed part 21h and configured such that the femoral region of the occupant is placed.

The line A-A in FIG. 13 passes through the hip-placed part 21h.

In an example of FIG. 14, the main pad portion 21 is configured separately from the side pad portions 22.

However, the main pad portion 21 and the side pad portions 22 may be integrally configured (integrally molded) in part or in whole.

Figure 15:
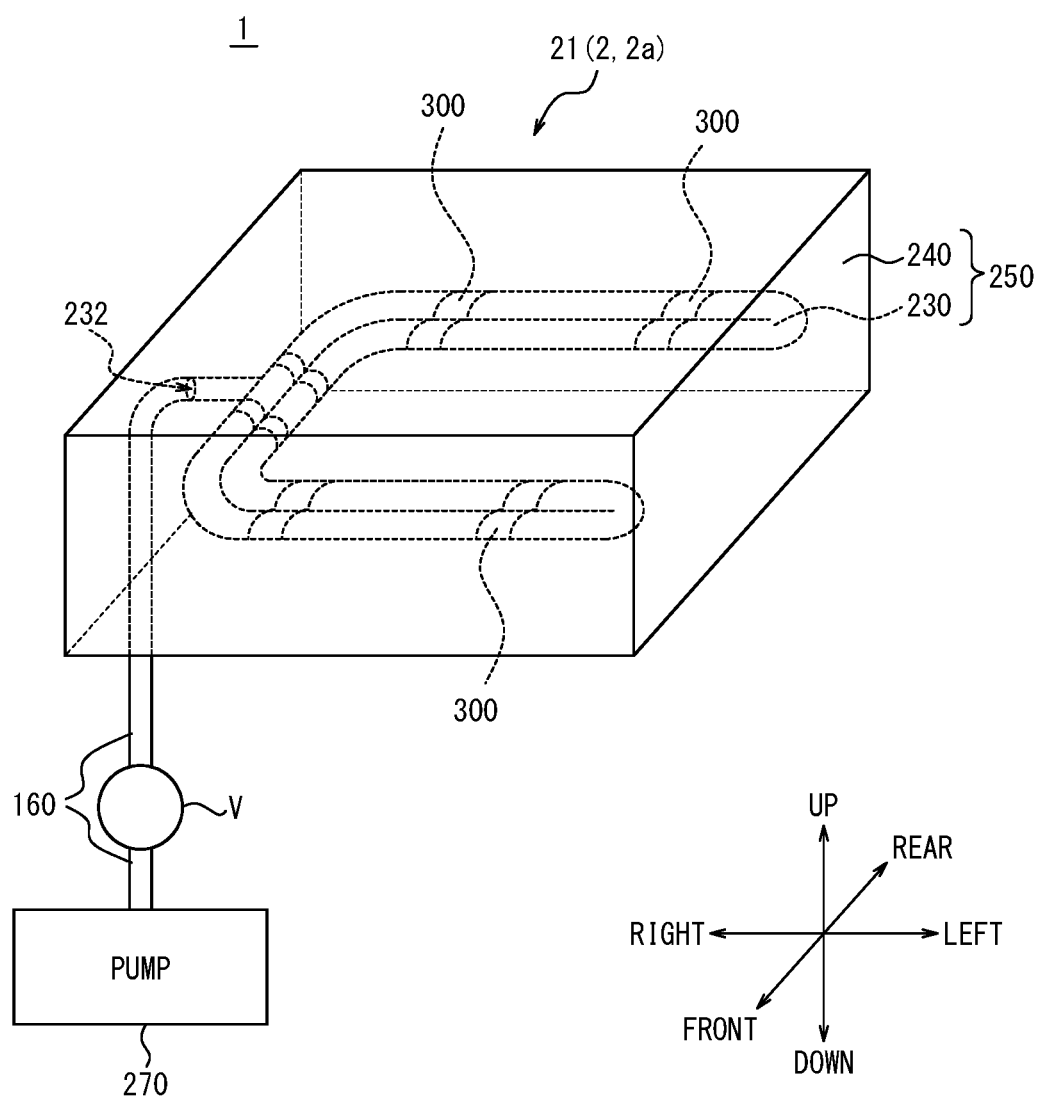
FIG. 15 is a perspective view illustrating a part of a seat pad according to the other embodiment of the disclosure.

FIG. 15 illustrates only the main pad portion 21 of the seat pad 2 in FIG. 14, and also illustrates the pump 270 and the first valve V provided in the vehicle seat 1. In the example of FIGS. 14 and 15, the seat pad 2 includes a bag-contained pad part 250 as a component of the main pad portion 21. The bag-contained pad part 250 includes an outer foam body 240 (foam body) made of foam and a bag body 230 arranged inside the outer foam body 240.

The bag body 230 of the present embodiment is arranged at a seating position of the occupant in the vehicle when the seat pad 2 is used as a vehicle seat pad. The bag body 230 is arranged inside the outer foam body 240 and embedded in the main pad portion 21 which is the seating position of the occupant described above and is configured to such that buttocks and a femoral region of the occupant are placed. In other words, the bag body 230 may be located at least below a hip of the occupant.

A material forming parts other than the bag-contained pad part 250 of the seat pad 2 is preferably a foam, more preferably elastic resin foam, and particularly preferably polyurethane foam.

Similarly, as a material of the foam forming the outer foam body 240, elastic resin foam is preferable, and polyurethane foam is particularly preferable. The material of the foam forming the outer foam body 240 may be similar to or different from the material forming the parts other than the bag-contained pad part 250 of the seat pad 2.

The bag body 230 is made of a stretchable material. In the description, the "stretchable material" refers to, for example, a material having a stretchable function, such as rubber of which volume changes depending on an internal pressure (air volume).

Specifically, the "stretchable material" forming the bag body 230 preferably has an elongation at 10 N, which is measured according to JIS standard: JIS K7161, of more than 6% and particularly more than 8%.

Here, the "elongation at 10 N measured according to JIS K7161" means an elongation (tensile strain) (%) obtained by dividing the amount of increase in a distance between marked lines by the distance between the marked lines and multiplying the divided value by 100 when a tensile force of 10 N is applied to a test piece using an extensometer according to JIS K7161 except for dimensions and test conditions of a test piece to be described below. Here, an Autograph AGS-1 kN manufactured by Shimadzu Corporation is used as the extensometer. The test piece has a rectangular plate shape of 80 mm (length in a tensile direction)×40 mm×0.26 mm (thickness). A stroke and a load are reset in a chucked state to start the test under the test conditions that the distance between the marked lines before the tensile force is applied is 50 mm and a tensile speed is 10 mm/min.

Further, it is preferable that the material forming the bag body 230 is flexible and has no air permeability.

As a material forming the bag body 230, for example, a synthetic resin or a rubber material is preferable. A specific example of such a material includes a resin film such as polyethylene (PE), polypropylene (PP), polyethylene terephthalate (PET), polyamide (PA), ethylene-vinylalcohol copolymer (EVOH), or ethylene-vinylacetate copolymer (EVA), but the rubber material is particularly preferable.

In the present embodiment, for example, a tube used for a bicycle tire is used as the bag body 230, and the tube is arranged inside the outer foam body 240 so as to be bent into a U shape in a planar view. The state of the bag body 230 is not limited to the U shape in a planar view, and may be, for example, a circular shape in a planar view or other shapes.

The bag body 230 (the tube in the present embodiment) is constrained so that the volume of the bag body 230 does not increase beyond a certain level. The bag body 230 made of a stretchable material expands when a fluid (for example, air) is supplied to the inside of the bag body 230, and changes in volume depending on the internal pressure (air volume), for example, like the rubber. However, the bag body 230 is constrained so that the volume does not increase beyond a certain level, that is, the shape of the bag body 230 is prevented from being changed when the internal pressure rises.

In the present embodiment, the bag body 230 expands to a thickness of 1 to 80% relative to the total thickness of the bag-contained pad part 250. When the bag body 230 expands, the bag body 230 is constrained to have preferably a thickness of 1 to 70% and particularly preferably a thickness of 1 to 60% relative to a thickness in the up-down direction of the bag-contained pad part 250 which is the total thickness of the bag-contained pad part 250.

As an example in which the volume of the bag body 230 is constrained so as not to increase beyond a certain level, a non-stretchable constraint body 300 is mounted to the bag body 230 of the present embodiment to constrain an outer side (an outer peripheral surface in the present embodiment) of the bag body 230 so that the volume of the bag body 230 does not increase beyond a certain level.

The constraint body 300 of the present embodiment is configured using, for example, a glass cloth tape that is obtained by forming a glass cloth substrate into a sticky tape. The tube of the bag body 230 is wound at a plurality of places (six places in the present embodiment) with the glass cloth tape, for example, in a circumferential direction orthogonal to a length direction of the tube. Since the tube of the of the bag body 230 is wound with the glass cloth tape of the constraint body 300, the tube is constrained as a whole so as not to expand beyond a certain level even when a part (a part not wound with the glass cloth tape) of the tube swells. The winding places of the constraint body 300 are not limited to the plurality of places (partial constraint), and may be, for example, one place or the total length (total-surface constraint), or all or part of the outer peripheral surface of the tube.

The constraint body 300 is necessary to have high tensile strength so as to be difficult to stretch and hardly stretch, and is desirably necessary to have heat resistance, to be excellent against temperature change, and not to be impregnated. When such conditions are satisfied, the constraint body 300 may be formed of a resin other than the glass cloth tape.

Figure 16A:
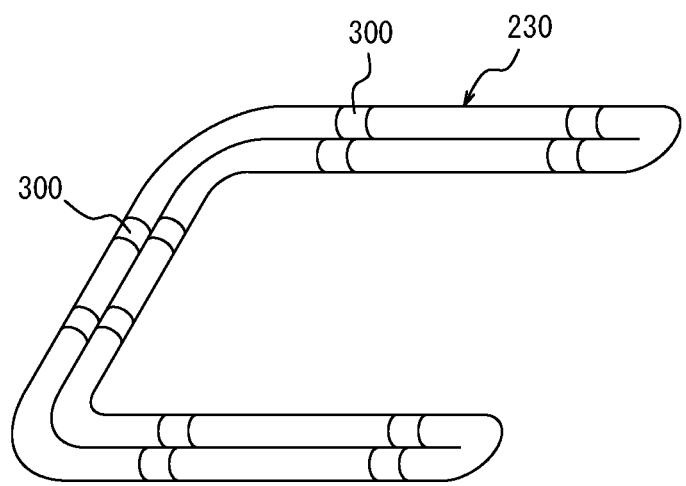
FIG. 16A is a perspective view illustrating a mode when a bag body in FIG. 15 is in a non-expanded state.
Figure 16B:
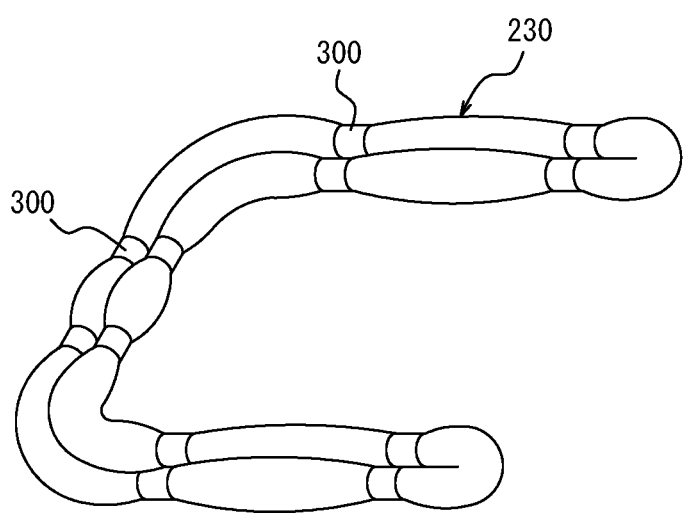
FIG. 16B is a perspective view illustrating a mode when a bag body in FIG. 15 is in an expanded state.

FIGS. 16A and 16B illustrate only the bag body 230 of the example of FIGS. 14 and 15. Since the bag body 230 is made of the stretchable material as described above, an inner surface and an outer surface of the bag body 230 greatly change in states where the bag body 230 does not expand (see FIG. 16A) and expands (see FIG. 16B). In other words, when a fluid is supplied to the inside of the bag body 230 from a state where the fluid is not contained in the bag body 230 (see FIG. 16A), the bag body 230 expands due to the rise of the internal pressure depending on the supply amount. However, after the bag body 230 reaches a certain volume, the bag body 230 hardly expands any more only by the rise of the internal pressure of the bag body 230, and a shape and a size of the bag body 230 are substantially or completely maintained (see FIG. 16B).

The reason is because the volume of the bag body 230 (the tube in the present embodiment) does not increase any more after the volume of the bag body 230 expands to a certain thickness, for example, a thickness of 1 to 80% relative to the total thickness of the bag-contained pad part 250 from a state where the volume of the bag body 230 is constrained so as not to increase beyond a certain level (in the present embodiment, the constraint body 300 is mounted to the bag body 230). In other words, the internal pressure of the bag body 230 increases, but the volume thereof does not increase.

In the present embodiment, air is used as the fluid supplied to the inside of the bag body 230, but it is preferable to use a liquid as an incompressibility fluid such as water or salt water, and it is particularly preferable to use a liquid consisting of various anti-freezing liquids, for example, a cooling liquid for a radiator, ethylene glycol, and silicon oil.

As illustrated in FIGS. 14 and 15, the pump 270 is connected to the bag body 230 such that the fluid can be supplied to the inside of the bag body 230. In the present example, an outlet port (not illustrated) of the pump 270 is connected to an opening 232 of the bag body 230 through a pipe 160, so that the fluid can be supplied to the inside of the bag body 230 through the pipe 160 and the opening 232 by the pump 270. An inlet port (not illustrated) of the pump 270 is arranged outside the seat pad 2, for example.

Although the opening 232 of the bag body 230 is arranged on side surfaces of the bag body 230 in the example of FIGS. 14 and 15, the opening 232 of the bag body 230 may be arranged on the side of a bottom or an upper surface of the bag body 230.

In the present example, the pump 270 is operated in a manual manner. However, the pump 270 may be controlled by a controller 15 to be described below.

In the example of FIGS. 14 and 15, the first valve V is provided in the pipe 160 arranged between the opening 232 of the bag body 230 and the pump 270. In the present example, the first valve V is a check valve configured to allow only the passage of the fluid from the pump 270 toward the bag body 230. Thus, the first valve V is opened while the fluid is supplied from the pump 270 to the bag body 230, but the first valve V is switched from the open state to a closed state when the pump 270 is stopped. Therefore, the fluid can be prevented from coming out of the bag body 230, and thus the bag body 230 can be maintained in the expanded state. In other words, after the fluid is supplied to the bag body 230, the bag body 230 can be maintained in the expanded state even when the pump 270 is not operated any more.

In the present example, the first valve V, which is the check valve, may be configured to be capable of switching an activation and a release of a check function of allowing only the passage of the fluid from the pump 270 to the bag body 230. In this case, the switching of the check function of the first valve V may be manually operated, or may be controlled by a controller 15 to be described below. The activation and the release of the check function are switchable, whereby the check function can be activated, for example, when the occupant is seated or when the engine of the vehicle body is started, and the check function can be released and the first valve V can be opened when the engine is stopped.

The first valve V may be an on-off valve, which is configured to be capable of opening and closing a flow channel, instead of the check valve. In this case, it is preferable that the opening and closing of the first valve V is mechanically switched in cooperation with the operation of the pump 270 via a link mechanism or is switched in cooperation with the operation of the pump 270 by the controller 15 to be described below. In other words, the first valve V may be opened while the fluid is supplied from the pump 270 to the bag body 230, and the first valve V may be switched from the open state to the closed state when the pump 270 is stopped.

However, as in the present example, the check valve may be preferable as the first valve V because of non-requirement of the operation or the control.

As described above, since the vehicle seat 1 includes the first valve V in the present example, after once the fluid is supplied to the bag body 230, the first valve V is switched from the open state to the closed state as described above, whereby the fluid can be prevented from coming out of the bag body 230 and thus the bag body 230 can be maintained in the expanded state even when the pump 270 is not operated any more.

However, the vehicle seat 1 may not include the first valve V.

Any method may be used as a method of discharging the fluid supplied to the inside of the bag body 230 to contract the bag body 230.

For example, although not illustrated, a switching valve (a second valve) may be provided on the pipe 160 between the opening 232 of the bag body 230 and the first valve V to be switchable between a supply state where the opening 232 of the bag body 230 communicates with the first valve V and a discharge state where the opening 232 of the bag body 230 communicates with the fluid outlet port (for example, atmosphere opening port). In such a case, the switching valve (second valve) may be switched to the discharge state when the fluid inside the bag body 230 is discharged, and the switching valve (second valve) may be switched to the supply state in other cases. In this case, the switching of the second valve being the switching valve may be manually operated, or may be controlled by a controller 15 to be described below.

Alternatively, a discharging pipe is connected to the bag body 230 separately from the pipe 160 on the side of the pump 270, and the discharging pipe may be provided with an on-off valve (second valve) configured to open and close the flow channel. In such a case, the on-off valve (second valve) may be switched to the open state when the fluid inside the bag body 230 is discharged, and the on-off valve (second valve) may be switched to the closed state in other cases. In this case, the opening and closing of the second valve being the on-off valve may be manually operated, or may be controlled by a controller 15 to be described below.

Alternatively, when the first valve V includes a check valve or an on-off valve configured such that the activation and the release of the check function are switchable, the fluid inside the bag body 230 may be discharged through the inlet port of the stop pump 270 after the first valve V is switched to an open state. In this case, the switching of the first valve V may be manually operated, or may be controlled by a controller 15 to be described below.

An operation of the present embodiment will be described with reference to FIGS. 17A to 17C.

Figure 17A:
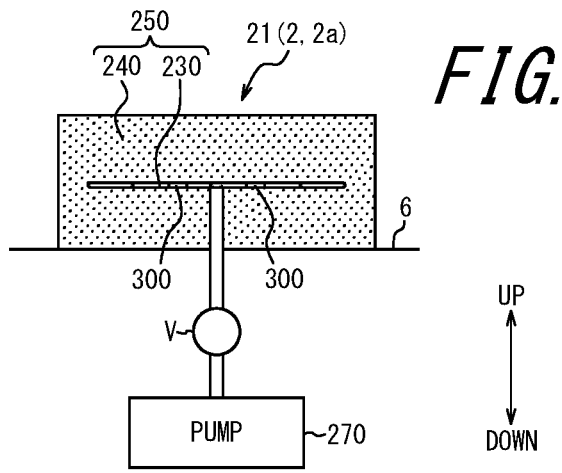
FIG. 17A is a view illustrating a first operation example of the vehicle seat according to the embodiment of the disclosure.
Figure 17B:
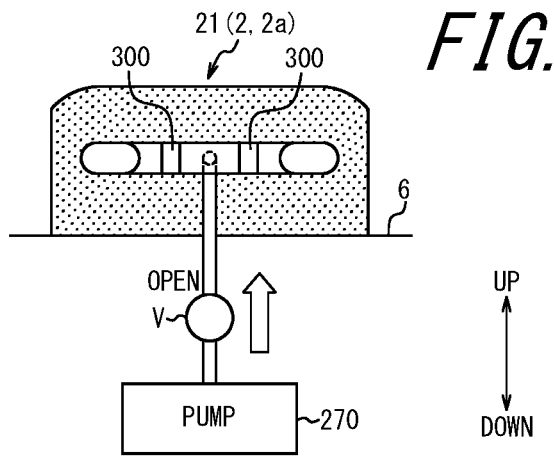
FIG. 17B is a view illustrating a second operation example of the vehicle seat according to the embodiment of the disclosure.
Figure 17C:
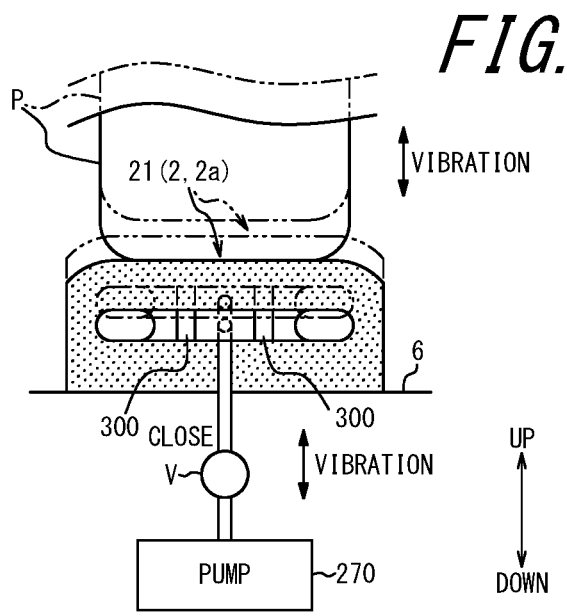
FIG. 17C is a view illustrating a third operation example of the vehicle seat according to the embodiment of the disclosure.

FIGS. 17A to 17C are views illustrating an operation of the examples of FIGS. 14 and 15. In the present example, as described above, the pump 270 is operated in a manual manner, and the first valve V is the check valve.

In FIG. 17A, the seat pad 2 is not applied with a load, the pump 270 is stopped, and the bag body 230 is in a contracted state. Thereafter, when the pump 270 is operated by an operator (for example, a person who is about to take a seat)

(FIG. 17B), air is supplied to the inside of the bag body 230 from the pump 270. Accordingly, the bag body 230 gradually expands and the upper surface of the outer foam body 240 gradually rises. In the meantime, the first valve V is opened. Then, when the pump 270 is stopped, the first valve V is closed. Therefore, air is prevented from flowing out from the bag body 230 to the pump 270, and the expanded state of the bag body 230 is maintained.

The operator operates the pump 270 to repeatedly supply the air to the bag body 230 while observing the rising state of the upper surface of the cushion pad 2a or to discharge the air from the bag body 230 using any method as described above, thereby appropriately adjusting the amount of air inside the bag body 230. Thereafter, when the occupant P sits on the seat pad 2 and the engine is started, vibration is applied to the vehicle body and the occupant P also vibrates up and down (FIG. 17C). In the meantime, the outer foam body 240 of the bag-contained pad part 250 repeatedly compresses and restores in the up-down direction, and the bag body 230 also vibrates inside the outer foam body 240 in the up-down direction. Thereafter, when the air inside the bag body 230 is discharged by any method as described above, the bag body 230 returns to the contracted state.

Effects of the present embodiment will be described below.

According to the present embodiment, first, it is possible to change vibration transmissibility (resonance magnification) of the cushion pad 2a of the seat pad.

In general, the vibration transmissibility of the cushion pad largely depends on damping performance of the cushion pad at the time of vibration excitation. In the present embodiment, the bag body 230 is arranged inside the outer foam body 240 to form the bag-contained pad part 250, so that air can be supplied to the inside of the bag body 230.

The air is supplied to the inside of the bag body 230, whereby the bag body 230 expands, the volume of air inside the bag body 230 (air volume) increases, and a large compressive force is applied to the outer foam body 240 (for example, polyurethane foam), which covers the outer side of the bag body 230, due to the expansion of the bag body 230. In other words, the compressive force is applied to the outer foam body 240 around the bag body 230 due to the expansion of the bag body 230 having a stretchable property, and the outer foam body 240 itself is compressed and crushed, so that a hardness of the outer foam body 240 itself changes to cause a change in a resonance point.

Accordingly, the amount of air inside the bag body 230 changes, the movement of the bag body 230 itself and the interaction between the bag body 230 and the outer foam body 240 can change at the time of vibration excitation, the damping performance of the bag-contained pad part 250 can change at the time of vibration excitation, and as a result, the vibration transmissibility of the bag-contained pad part 250 and the cushion pad 2a can change. Specifically, when the amount of air inside the bag body 230 is increased, the vibration transmissibility of the bag-contained pad part 250 and the cushion pad 2a can be increased, and thus the cushion pad 2a comes to bounce more greatly at the time of vibration excitation (particularly, when vibration near a resonance frequency is input).

Further, according to the present embodiment, when the amount of air inside the bag body 230 of the bag-contained pad part 250 is changed, the vibration transmissibility and thus vibration waveform (dynamic waveform) of the seat pad can be changed, a compression deflection curve (static waveform), which is a characteristic when the cushion pad is compressed slowly, can also be changed. Thus, it is possible to change a sense of seating that the occupant feels when taking a seat. For example, it is possible to obtain a sense of seating that the occupant feels softer at first and feels harder later when taking a seat by adjustment of the amount of air inside the bag body 230.

As described above, according to the present embodiment, it is possible to change both the vibration transmissibility and the sense of seating of the seat pad 2 which is a component of the vehicle seat 1.

According to the method of adjusting the opening area of the ventilation window of the pan frame provided on the back side of the cushion pad of the seat pad as in PTL 1, the vibration transmissibility can be changed when the opening area of the ventilation window of the pan frame is changed as described above, but the compression deflection curve (static waveform) and the sense of seating can be hardly changed. The reason is because inflow and outflow of air at the ventilation window of the pan frame affects the cushion pad when the cushion pad is compressed quickly as in the case of vibration excitation, but does not affect the cushion pad when the cushion pad is compressed slowly as in the case of taking a seat.

Further, according to the present embodiment, when the amount of air inside the bag body 230 of the bag-contained pad part 250 is changed, the vibration transmissibility of the seat pad can be changed, but a resonance frequency of the seat pad can be hardly changed.

As described above, according to the present embodiment, it is possible to change the vibration transmissibility of the seat pad 2 independently without substantially changing the resonance frequency of the seat pad 2 of the vehicle seat 1. Therefore, the vibration transmissibility of the seat pad 2 can be easily adjusted. For example, it is possible to independently adjust the resonance frequency using another method while adjusting the vibration transmissibility using the method of the present embodiment.

In the present embodiment, the bag body 230 is made of a stretchable material, but the volume of the bag body 230 is constrained so as not to increase beyond a certain level by the constraint body 300. Thus, there is also an advantage that the internal pressure of the bag body 230 can be easily managed.

When the bag body 230 is made of the stretchable material, the bag body 230 continues to expand while the fluid is supplied to the inside of the bag body 230, but the bag body 230 is constrained by the constraint body 300, so that the expansion of the bag body 230 stops at the time when the volume of the bag body 230 is in a constrained state before exceeding a certain level, the internal pressure thereof significantly rises, and a new fluid is difficult to be supplied. Therefore, since the maximum filling-up of the bag body 230 is easily grasped and the supply of the fluid to the inside of the bag body 230 can be appropriately controlled, it is possible to prevent the rupture of the bag body 230 which may occur when the supply of the fluid can hardly be controlled.

It is important that the bag body 230 is arranged inside the outer foam body 240 as in the present embodiment, in other words, the outer foam body 240 covers almost the entire outer surface of the bag body 230. When the bag body 230 is not provided inside the outer foam body 240 and is simply attached to the bottom or the upper surface of the outer foam body 240, the bag body 230 hardly affects the operation of the outer foam body 240 even when the amount of air inside the bag body 230 is changed. Therefore, the vibration transmissibility and the sense of seating hardly change.

The bag body 230 of the present embodiment is arranged inside the outer foam body 240 and is spaced from the outer surface (outer surface of the pad) of the seat pad 2 by a certain distance, that is, is embedded so as to be located substantially in the center of the inside of the main pad portion 21 without contacting (exposing from the outer surface) with the entire outer surface of the main pad portion 21.

Since the bag body 230 is located substantially in the center of the inside of the main pad portion 21, the periphery of the bag body 230 is enclosed by the foam (for example, polyurethane foam) of the main pad portion 21, and a damping effect on the fluid (for example, air) supplied to the bag body 230 can be appropriately obtained.

The outer foam body 240 and the bag body 230, which are components of the bag-contained pad part 250, are preferably molded integrally. In other words, during injection molding of the outer foam body 240, it is preferable that the outer foam body 240 be molded by injecting a molten resin into a mold in a state where the bag body 230 is inserted into the mold.

Thereby, even when the outer foam body 240 and the bag body 230 move at the time of vibration excitation or when the occupant takes a seat, the outer foam body 240 can be effectively maintained in a state of being in close contact with the periphery of the bag body 230. Therefore, the vibration transmissibility and the sense of seating can be changed more effectively.

In a seat pad manufacturing method for manufacturing the seat pad according to the disclosure, the outer foam body 240 and the bag body 230 of the seat pad 2 of the present embodiment are integrally formed by a method of manufacturing the bag-contained pad part 250.

The bag-contained pad part 250 of the present embodiment is manufactured through a bag body attaching step, an injecting step, and a foaming step, and the bag body 230 in the bag body attaching step is constrained by the constraint body 300 so that the volume of the bag body 230 does not increase beyond a certain level.

Figure 18:
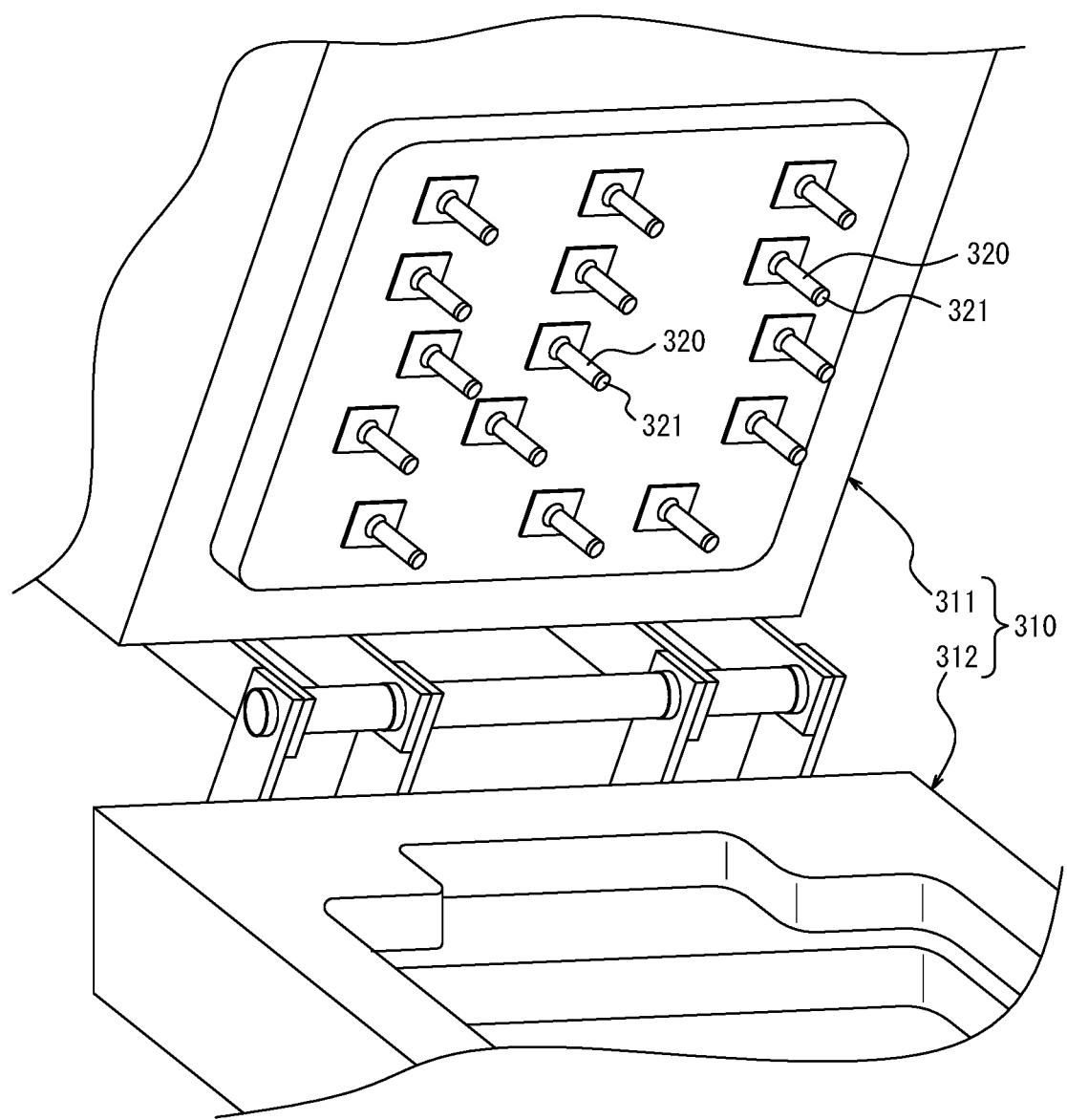
FIG. 18 is an explanatory diagram illustrating a schematic structure of a mold used in a seat pad manufacturing method according to the other embodiment of the disclosure.
Figure 19:
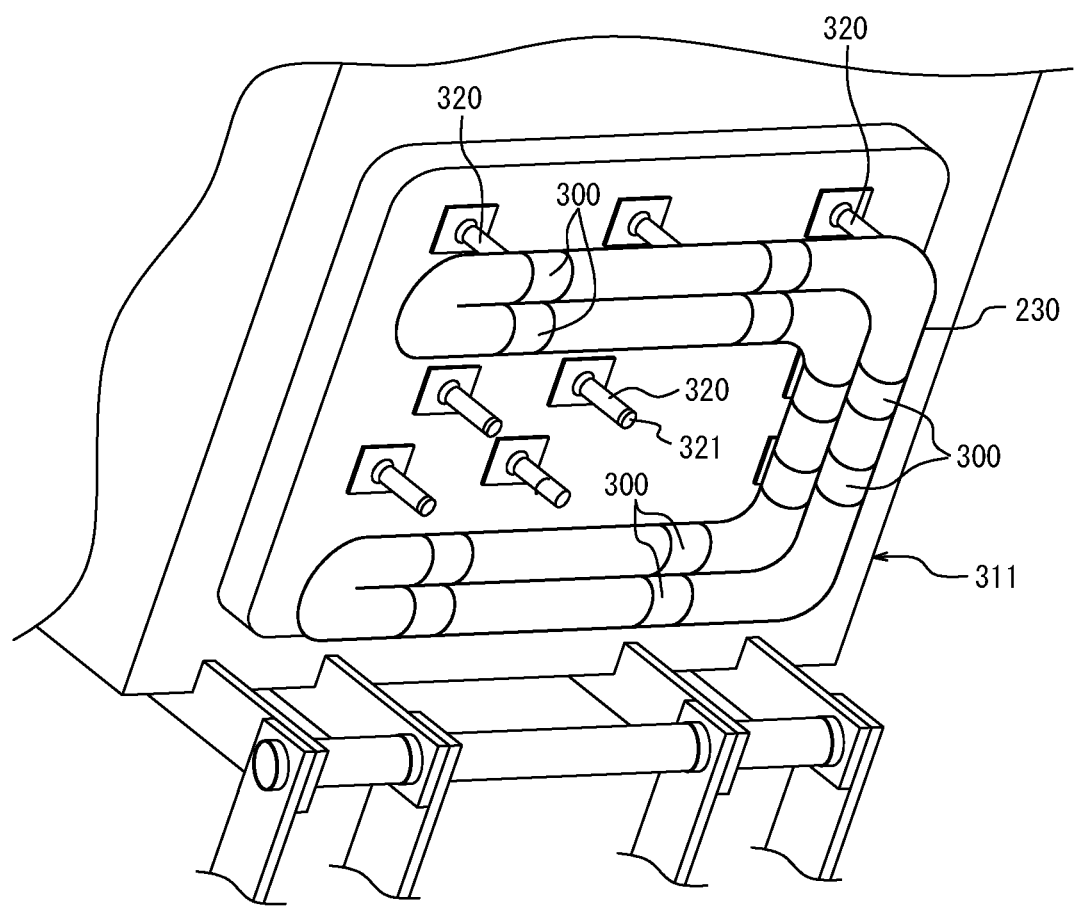
FIG. 19 is an explanatory diagram illustrating a state where the bag body is attached to an upper mold piece of FIG. 18.

FIG. 18 is an explanatory diagram illustrating a schematic structure of a mold used in the method of manufacturing the bag-contained pad part according to the embodiment of the disclosure. FIG. 19 is an explanatory diagram illustrating a state where the bag body is attached to an upper mold piece of FIG. 18.

In the present embodiment, first, in the bag body attaching step, a metal piece 330 as a to-be-held portion provided in the bag body 230 is held by a pin 320 as a holding portion provided in a mold 310, and the bag body 230 is positioned and attached to the mold 310. For example, a metal washer can be used as the metal piece 330, and the metal washer can be stuck to the bag body 230 (the tube of the present embodiment) with an aluminum tape, for example.

As illustrated in FIG. 18, the mold 310 of the present embodiment includes an upper mold piece 311 and a lower mold piece 312, and the upper mold piece 311 is arranged with a plurality of pins 320 corresponding to the arrangement state (see FIG. 15) of the bag body 230 in the outer foam body 240. The pins 320 are installed to protrude inside the mold 310 so that the bag body 230 is floated inside the mold 310. According to such a configuration, the bag-contained pad part 250 is more easily manufactured.

The pin 320 of the present embodiment has a protruding height that allows the bag body 230 to be located substantially in the center of the inside of the outer foam body 240 when the outer foam body 240 and the bag body 230 are integrally molded, and a magnet 321 is attached to a protruding end.

As illustrated in FIG. 19, when the metal piece 330 provided to the bag body 230 is attached to the magnet 321, the bag body 230 can be fixed to a tip of the pin 320 in the arrangement state (see FIG. 15) in the outer foam body 240.

After the bag body 230 is attached to the upper mold piece 311 by positioning, the upper mold piece 311 and the lower mold piece 312 are closed corresponding to each other. At this time, the bag body 230 is set in the mold 310 in a state where the magnet 321 and the metal piece 330 are attached to each other and held at the tip of the pin 320.

Next, in the injecting step, a foamable material is injected to the mold 310 to which the bag body 230 is attached. In the present embodiment, an example of the foamable material includes a molten resin that is a raw material of polyurethane foam, and the molten resin is injected into the mold 310.

Next, in the foaming step, the foamable material in the mold 310 is foamed. At the time of foaming, since the molten resin being foamable material injected into the mold 310 swells from a substantially liquid state, various forces are applied to the bag body 230 inside the mold 310 in various directions such as a vertical direction and a horizontal direction until the bag body is filled. However, since the bag body 230 in the mold 310 is fixed to the tip of the pin 320, the bag body 230 is positioned and held in the mold 310 even during the foaming. Note that the bag body 230 may be slightly inflated when the foamable material is foamed.

Then, the upper mold piece 311 and the lower mold piece 312 are opened, and the molded outer foam body 240 is taken out from the lower mold piece 312 (demolding). Thus, the outer foam body 240 containing the bag body 230 is formed by foam molding.

In this manner, it is possible to manufacture the bag-contained pad part 250 in which the outer foam body 240 and the bag body 230 are integrally formed, using the method of manufacturing the bag-contained pad part of the present embodiment. Since the manufactured bag-contained pad part 250 is in a state where the outer surface of the bag body 230 and the inner surface of the outer foam body 240 are adhered and integrated, the bag body 230 is contained in the outer foam body 240 in a state where the arrangement shape in the upper mold piece 311 is held, without being crushed even when the fluid is not supplied.

Note that the bag body 230 and the outer foam body 240 may not be adhered to each other, and, for example, may be in a close state, that is, a state where at least a change (such as expansion) of the bag body 230 is reliably transmitted to the outer foam body 240 and the outer foam body 240 changes depending on the change of the bag body 230.

Figure 20:
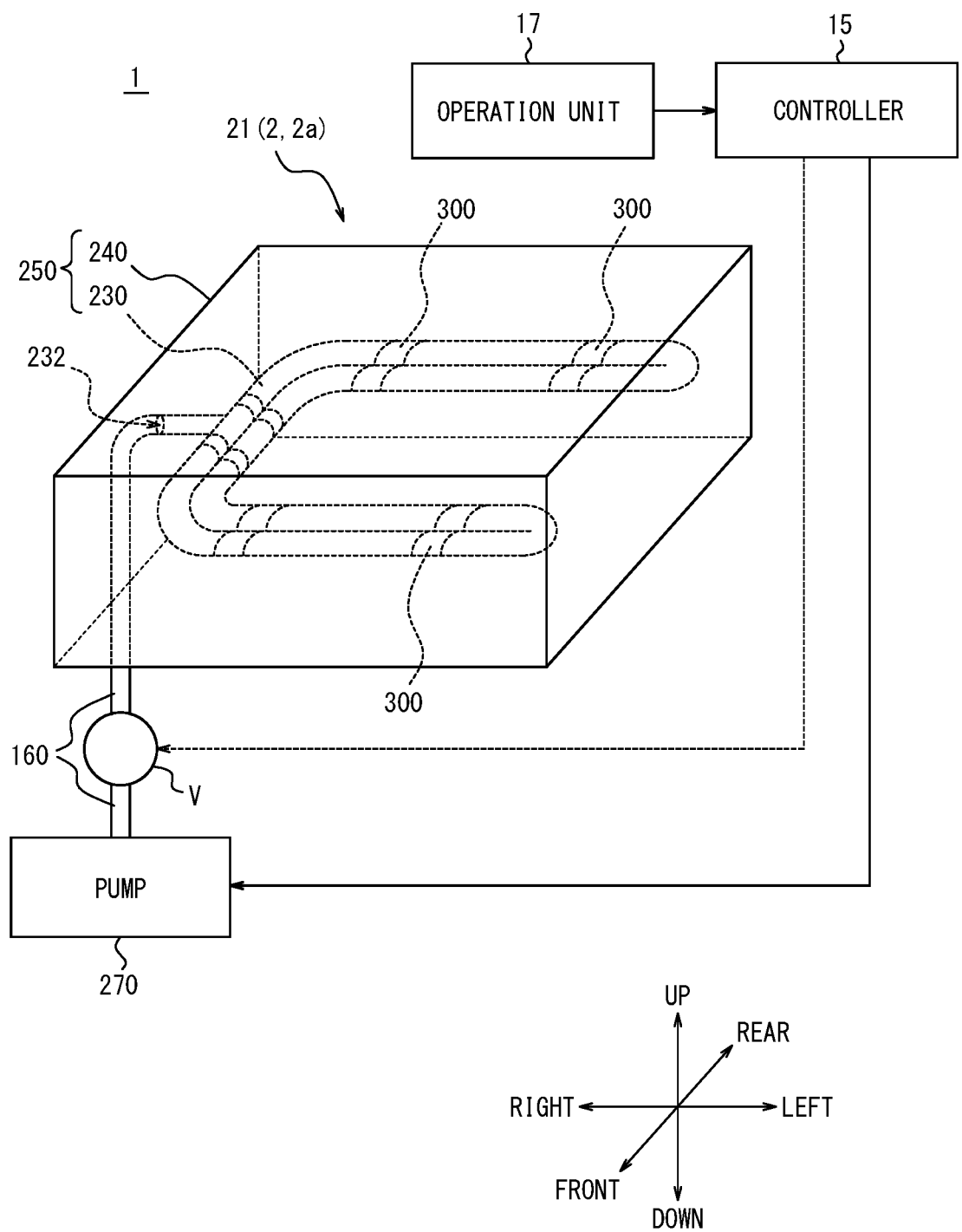
FIG. 20 is a view illustrating a vehicle seat according to a first modification of the other embodiment of the disclosure.

FIG. 20 is a view corresponding to FIG. 15 and illustrates a first modification of the vehicle seat 1.

An example of FIG. 20 is different from the example of FIG. 15 in that the vehicle seat 1 further includes an operation unit 17 that receives a manual operation of the operator and a controller 15.

The controller 15 is configured to control the start (ON) and the stop (OFF) of the pump 270 according to a signal from the outside. An example of the "signal from the outside" includes any signal of a signal output from the operation unit 17 when the operation unit 17 is manually operated, a signal output from a sensor on a side of the engine, and/or a signal output from a sensor on a side of the pump 270 when a sensor such as a pressure sensor is provided on the side of the pump 270.

The controller 15 includes a control device such as an ECU (Engine Control Unit) or a CPU (Central Processing Unit). The controller 15 may be arranged outside or inside the pump 270.

The controller 15 may be configured to control a supply pressure of the pump 270 according to the signal from the outside (the signal output from the operation unit 17, the signal output from the sensor on the side of the engine, and the signal output from the sensor on the side of the pump 270).

Further, the controller 15 may also be configured to control the switching of the first valve V according to the signal from the outside (the signal output from the operation unit 17, the signal output from the sensor on the side of the engine, and the signal output from the sensor on the side of the pump 270).

In addition, when the vehicle seat 1 includes the above-described second valve (not illustrated) for discharging, the controller 15 can also be configured to control the switching of the second valve according to the signal from the outside (the signal output from the operation unit 17, the signal output from the sensor on the side of the engine, and the signal output from the sensor on the side of the pump 270).

According to the present example, since the operator can operate the pump 270 via the controller 15, the amount of fluid inside the bag body 230 can be easily adjusted.

The vehicle seat 1 of the present embodiment is not limited to the case where the overall configuration of the main pad portion 21 of the seat pad 2 is configured by one bag-contained pad part 250 as in the example of FIG. 14. The main pad portion 21 of the seat pad 2 may include a plurality of bag-contained pad parts 250. In addition, a part in the up-down direction and/or a horizontal direction of the main pad portion 21 may be configured by the bag-contained pad part 250, and the other part may be configured by a general foam that does not include the bag body 230. Further, not only the main pad portion 21 of the seat pad 2 but also a part or all of the side pad portion 22 may be configured by one or a plurality of bag-contained pad parts 250. Further, when the cushion pad 2a is viewed in a planar view (when viewed from above), the plurality of bag-contained pad parts 250 may be arranged at different positions (for example, different positions in a front-rear direction or a left-right direction).

Figure 21:
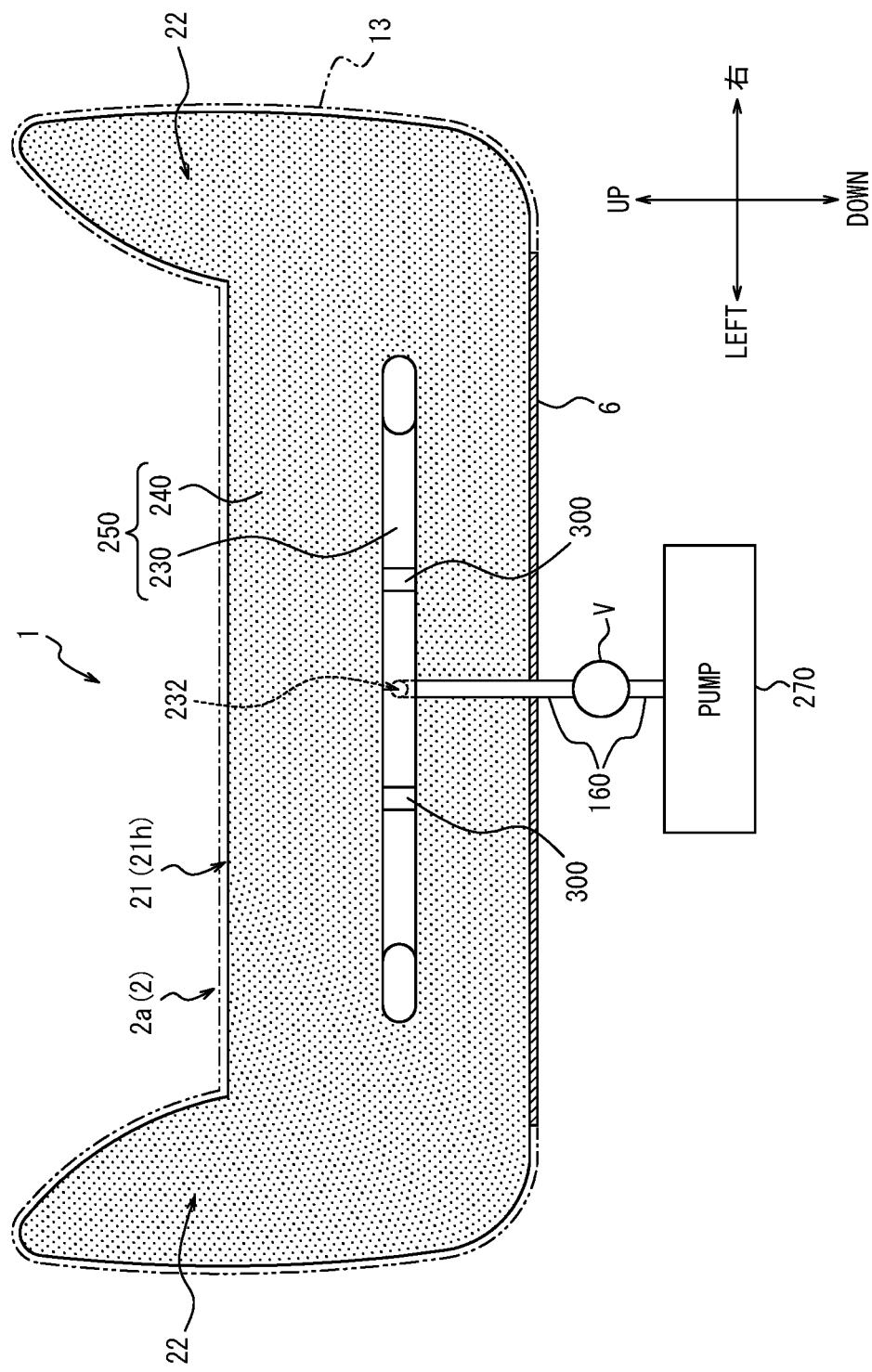
FIG. 21 is a view illustrating a vehicle seat according to a second modification of the other embodiment of the disclosure.
Figure 22:
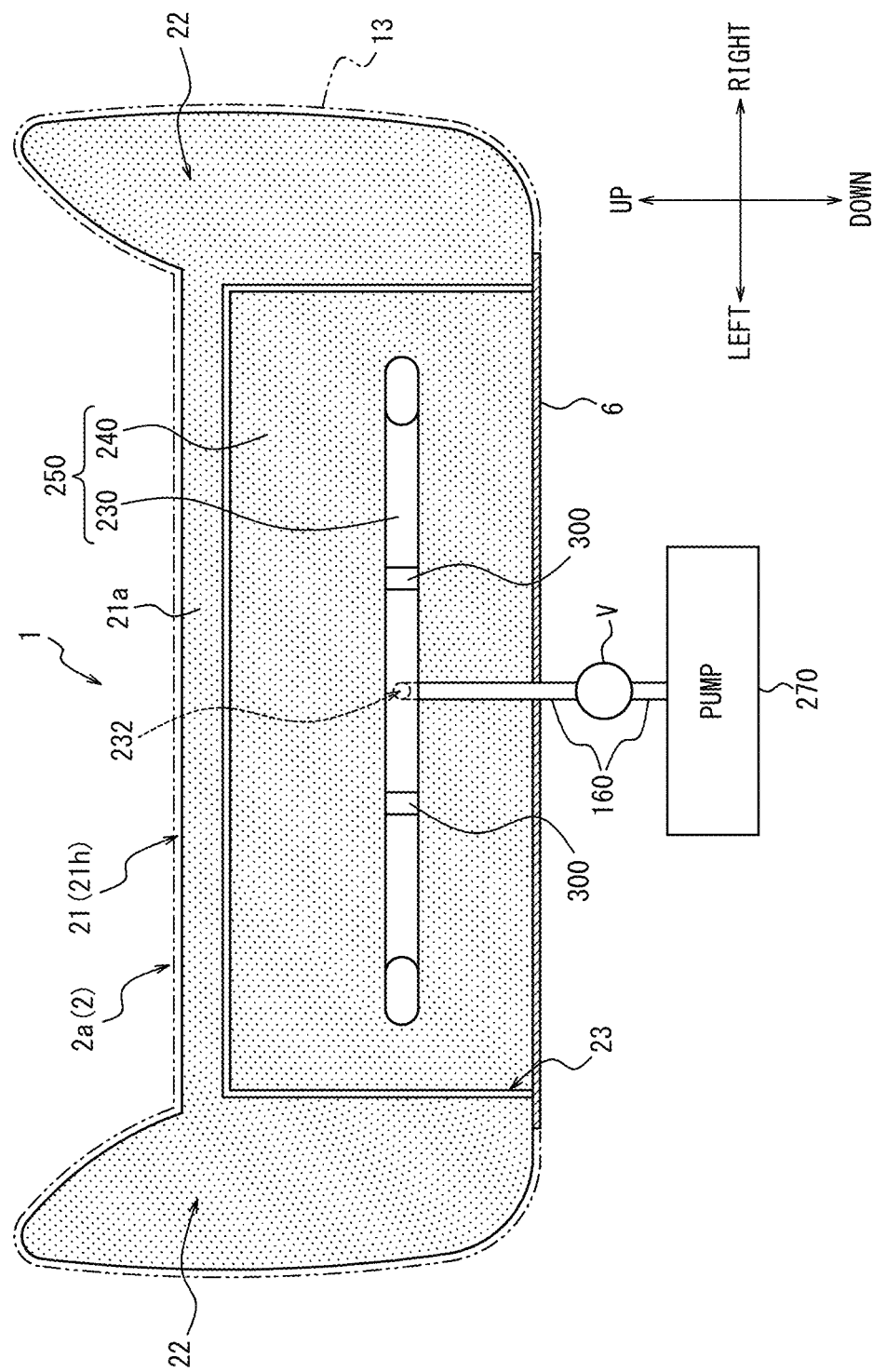
FIG. 22 is a view illustrating a vehicle seat according to a third modification of the other embodiment of the disclosure.

FIGS. 21 and 22 illustrate a second modification and a third modification, respectively, and are views corresponding to FIG. 14.

In respective examples in the description, the main pad portion 21 may be configured integrally with the pair of left and right side pad portions 22 as in the second modification illustrated in FIG. 21. In this case, the bag-contained pad part 250 is a component of the entire cushion pad 2a, and the outer foam body 240 includes both a foam body as a component of the main pad portion 21 and a foam body as a component of the pair of side pad portions 22.

Alternatively, in respective examples in the description, the main pad portion 21 includes the bag-contained pad part 250 and a covering part 21a that covers an upper side of the bag-contained pad part 250 as in the third modification illustrated in FIG. 22, and the covering part 21a of the main pad portion 21 may be configured integrally with the pair of left and right side pad portions 22. In this case, the bag-contained pad part 250 is accommodated from the back side into a recess 23 defined by the covering part 21a of the main pad portion 21 and the pair of side pad portions 22 on the back side of the cushion pad 2a of the seat pad 2 when the seat pad is manufactured.

At least a part of the bag body 230 is preferably located directly under a portion of the upper surface, onto which a load is applied from the occupant, of the cushion pad 2a.

Specifically, at least a part of the bag body 230 is preferably arranged inside the main pad portion 21 (hip-placed part 21h and/or femoral region-placed part 21t) of the cushion pad 2a, and particularly, is preferably arranged inside the hip-placed part 21h of the main pad portion 21.

Thus, the vibration transmissibility and the sense of seating can be changed more effectively.

From the same viewpoint, the entire bag body 230 is preferably arranged inside the main pad portion 21 of the cushion pad 2a as in the example of FIG. 14.

In the examples of FIGS. 14 to 16, the bag body 230 has a substantially U shape when viewed from above, in the expanded state. However, the bag body 230 may have any three-dimensional shape in the expanded state.

Since the volume of the bag body 230 is constrained so as not to increase beyond a certain level, it is possible to obtain almost the same as the above-described effect (the vibration transmissibility and the sense of seating can be changed) even when the shape of the bag body 230 is changed in the expanded state.

The arrangement position in the thickness direction (up-down direction) of the bag body 230 in the outer foam body 240 is not limited to a substantially central position in the thickness direction in the outer foam body 240 as illustrated in FIG. 14, and may be a position that deviates to the upper surface side or the bottom surface side in the thickness direction in the outer foam body 240.

Since the thickness of the outer foam body 240 and the volume of the bag body 230 are constrained so as not to increase beyond a certain level, it is possible to obtain almost the same as the above-described effect (the vibration transmissibility and the sense of seating can be changed) even when the arrangement position in the thickness direction (up-down direction) of the bag body 230 in the outer foam body 240 is changed.

FIGS. 23A to 23G illustrate states of the cushion pad 2a as viewed from above in fourth to tenth modifications, respectively, and illustrate the shape and arrangement in the expanded state of the bag body 230 as viewed from above. The bag body 230 of the present example may be either of the tube used to the bicycle tire described above or a bag body made of a stretchable material other than the tube, and the bag body 230 is constrained by the constraint body 300 provided at a necessary place corresponding to the shape and the arrangement state so that the volume of the bag body 230 does not increase beyond a certain level.

Figure 23A:
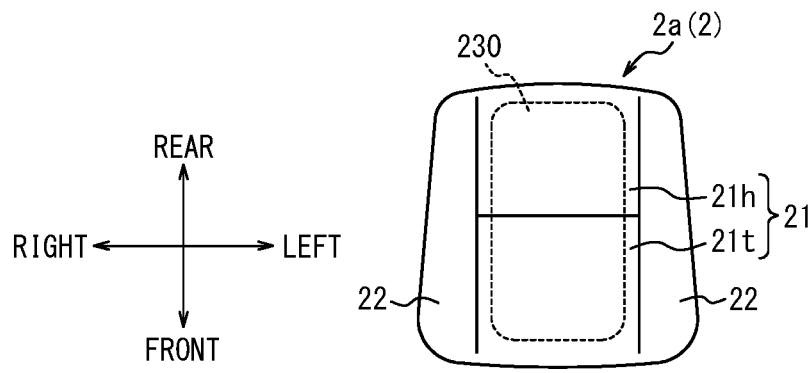
FIG. 23A is a view illustrating a vehicle seat according to a fourth modification of the other embodiment of the disclosure.

In an example of FIG. 23A, the bag body 230 has a substantially rectangular shape that is long in the front-rear direction as viewed from above. The bag body 230 is arranged only inside the main pad portion 21 and extends in the front-rear direction over both the hip-placed part 21h and the femoral region-placed part 21t of the main pad portion 21.

Figure 23B:
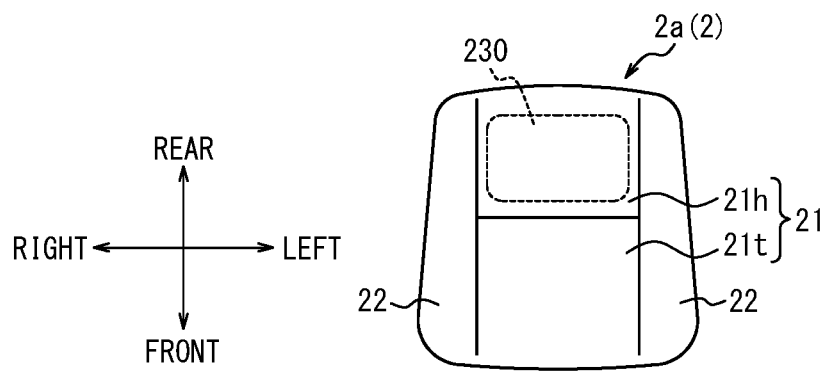
FIG. 23B is a view illustrating a vehicle seat according to a fifth modification of the other embodiment of the disclosure.

In an example of FIG. 23B, the bag body 230 has a substantially rectangular shape that is long in the left-right direction as viewed from above. The bag body 230 is arranged only inside the hip-placed part 21h of the main pad portion 21.

Figure 23C:
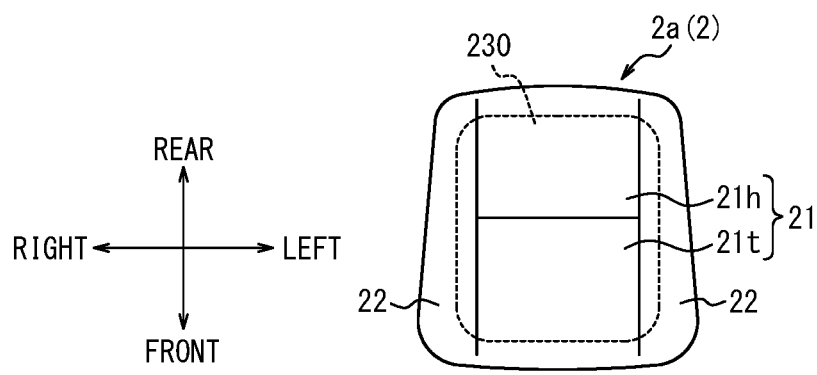
FIG. 23C is a view illustrating a vehicle seat according to a sixth modification of the other embodiment of the disclosure.

In an example of FIG. 23C, the bag body 230 has a substantially square shape as viewed from above. The bag body 230 is arranged over the entire cushion pad 2a including not only the main pad portion 21 but also the side pad portion 22.

In an example of FIG. 23D, the bag body 230 has a figure-eight shape as viewed from above. The bag body 230 includes two recesses 230a on left and right sides, each of the recesses including a vertical through-hole or a hollow that is dented downward. The bag body 230 is arranged only inside the hip-placed part 21h of the main pad portion 21. According to the present example, since a pair of hipbones of the occupant are accommodated in the two recesses 230a when the occupant takes a seat, a sitting comfort of the occupant can be improved and the posture of the occupant can also be improved.

In an example of FIG. 23E, the bag body 230 has an annular shape as viewed from above. The bag body 230 includes one recess 230a, the recess including a vertical through-hole or a hollow that is dented downward. The bag body 230 is arranged only inside the hip-placed part 21h of the main pad portion 21. According to the present example, since a pair of hipbones of the occupant are accommodated in the recess 230a when the occupant takes a seat, a sitting comfort of the occupant can be improved and the posture of the occupant can also be improved.

In an example of FIG. 23F, the bag body 230 has a U shape as viewed from above. The bag body 230 includes one recess 230a, the recess including a vertical through-hole or a hollow that is dented downward. The recess 230a is arranged in a rear part of the bag body 230 and a rear end of the recess is opened. The bag body 230 is arranged over the entire cushion pad 2a including not only the main pad portion 21 but also the side pad portion 22. According to the present example, since a pair of hipbones of the occupant are accommodated in the recess 230a when the occupant takes a seat, a sitting comfort of the occupant can be improved and the posture of the occupant can also be improved.

In an example of FIG. 23G, the bag body 230 has an inverted U shape that is reverse in an up-down direction to a U shape as viewed from above. The bag body 230 includes one recess 230a, the recess including a vertical through-hole or a hollow that is dented downward. The recess 230a is arranged in a front part of the bag body 230 and a front end of the recess is opened. The bag body 230 is arranged over the entire cushion pad 2a including not only the main pad portion 21 but also the side pad portion 22. Even in the present example, a sitting comfort of the occupant can be improved and the posture of the occupant can also be improved.

An example of the vehicle seat of the disclosure will be described below with reference to FIG. 24.

Example 2

Figure 24:
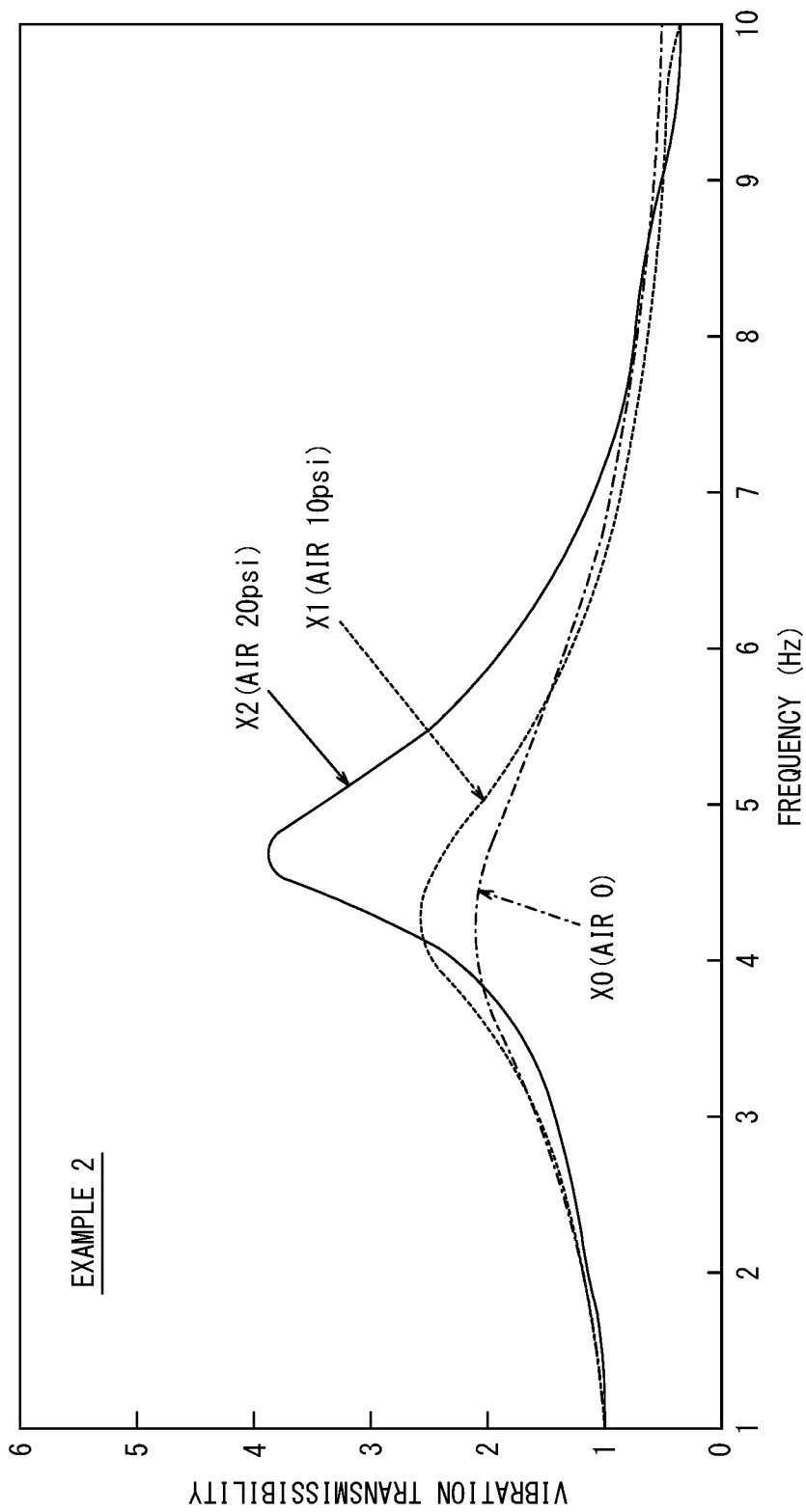
FIG. 24 is a view illustrating a dynamic waveform obtained as a result of performing an experiment in Example 2 of the seat pad of the disclosure.

FIG. 24 illustrates a vibration waveform (dynamic waveform) obtained as a result of performing a vibration experiment of the seat pad in Example 2 of the disclosure.

As illustrated in FIG. 15, a test specimen in Example 2 was assumed as the main pad portion 21 of the cushion pad 2a to prepare the bag-contained pad part 250, and the pump 270 and the first valve V were connected to the bag-contained pad part 250. The bag-contained pad part 250 was formed by integrally molding the outer foam body 240 and the bag body 230. The outer foam body 240 of the bag-contained pad part 250 was made of polyurethane foam.

The dimension of the bag-contained pad part 250 (dimension of the outer foam body 240) in a state where the bag body 230 was crushed was 400 mm×400 mm×100 mm. The bag body 230 was arranged substantially at the center of the outer foam body 240 in the up-down direction, the left-right direction, and the front-rear direction. The bag body 230 of the bag-contained pad part 250 was made of a rubber material. The opening 232 of the bag body 230 was arranged on the side surface of the bag body 230. In addition, the opening 232 of the bag body 230 was connected to the outlet port of the pump 270 by the pipe 160. The pump 270 was operated in a manual manner. The first valve V was a check valve. The second valve for discharging was provided in the pipe 160 between the pump 270 and the first valve V.

In a vibration test of Example 2, after the amount of air inside the bag body 230 of the test specimen was adjusting in advance by the operation of the pump 270 and the second valve, the test specimen was placed on a receiving tool assumed as the pan frame 6. Then, assuming that an occupant of 50 kg was seated, a pressing element made of an iron press plate of 50 kg was placed from above. In such a state, when pressures of air inside the bag body 230 are 0 psi (the amount of air is zero), 10 psi (the amount of air is small), and 20 psi (the amount of air is large), respectively, the vibration tests were performed at a frequency of 1 to 10 Hz and a sweep time of 5 minutes. The results are illustrated in FIG. 24.

In the vibration waveform illustrated in FIG. 24, a horizontal axis indicates a frequency (Hz), and a vertical axis indicates vibration transmissibility.

As can be seen from FIG. 24 in which a waveform is X0 when the pressure of air inside the bag body 230 is 0 psi, a waveform is X1 when the pressure of air is 10 psi, and a waveform is X2 when the pressure of air is 20 psi, as the pressure of air inside the bag body 230 increases (a compression ratio increases), a resonance point becomes an upper right, that is, resonance frequency increases, and the vibration transmissibility also increases. Specifically, the difference between the resonance frequency when the air pressure is 0 psi (waveform X0) and the resonance frequency when the air pressure is 10 psi (waveform X1) is 0.1, and the difference between the resonance frequency when the air pressure is 0 psi (waveform X0) and the resonance frequency when the air pressure is 20 psi (waveform X2) is 0.5. The difference between the resonance magnification when the air pressure is 0 psi (waveform X0) and the resonance magnification when the air pressure is 10 psi (waveform X1) is 0.47, and the difference between the resonance magnification when the air pressure is 0 psi (waveform X0) and the resonance magnification when the air pressure is 20 psi (waveform X2) is 1.23.

As described above, according to Example 2, it is possible to solely adjust only the vibration transmissibility by the adjustment of the amount of air inside the bag body 230.

INDUSTRIAL APPLICABILITY

A seat pad, a vehicle seat, a vehicle seat controlling method, and a seat pad manufacturing method of the disclosure can be used for any type of vehicles, but, in particular, can be suitably used for passenger vehicles that are required to have high comfortability or large vehicles such as trucks, buses, and construction vehicles that bring about large vibrations.

REFERENCE SIGNS LIST 1 vehicle seat
2 seat pad
2a cushion pad 2b back pad
6 pan frame
13 cover member
15 controller
17 operation unit
21 main pad portion
21a covering part
21h hip-placed part
21t femoral region-placed part
22 side pad portion
23 recess
160 pipe
230 bag body
230a recess
232 opening
240 outer foam body (foam body)
250 bag-contained pad part
270 pump
P occupant
V first valve
300 constraint body
310 mold
311 upper mold piece
312 lower mold piece
320 pin (holding portion)
330 metal piece (to-be-held portion)
321 magnet

The invention claimed is:

1. A vehicle seat comprising:
a seat pad including a main pad portion and a pair of side pad portions located on both left and right sides of the main pad portion; and
a pump,
wherein the main pad portion includes:
  a bag-contained pad part including a foam body and a bag body arranged inside the foam body; and
  a covering part covering an upper side of the bag-contained pad part,
wherein the pump is connected to the bag body to supply a fluid to an inside of the bag body,
wherein the covering part is configured integrally with the pair of side pad portions, and
wherein the bag-contained pad part is accommodated in a recess defined by the covering part and the pair of side pad portions.

2. The vehicle seat according to claim 1, wherein the bag body is made of a non-stretchable material.

3. The vehicle seat according to claim 1, wherein a first valve is provided between the bag body and the pump, and
the first valve is a check valve or an on-off valve configured to allow only a passage of the fluid from the pump toward the bag body.

4. The vehicle seat according to claim 1, wherein an incompressibility fluid is provided to be capable of being supplied to the inside of the bag body.

5. The vehicle seat according to claim 1, wherein
the bag body is made of a stretchable material, and
the bag body is constrained so that a volume of the bag body does not increase beyond a certain level.

6. The vehicle seat according to claim 2, wherein
a first valve is provided between the bag body and the pump, and
the first valve is a check valve or an on-off valve configured to allow only a passage of the fluid from the pump toward the bag body.

7. The vehicle seat according to claim 2, wherein
an incompressibility fluid is provided to be capable of being supplied to the inside of the bag body.

8. The vehicle seat according to claim 5, wherein
a first valve is provided between the bag body and the pump, and
the first valve is a check valve or an on-off valve configured to allow only a passage of the fluid from the pump toward the bag body.

9. The vehicle seat according to claim 5, wherein
an incompressibility fluid is provided to be capable of being supplied to the inside of the bag body.

10. The vehicle seat according to claim 8, wherein
an incompressibility fluid is provided to be capable of being supplied to the inside of the bag body.

11. A seat pad manufacturing method for manufacturing a seat pad including a main portion and a pair of side portions located on both left and right sides of the main pad portion, the main pad portion including a bag-contained pad part and a covering part covering an upper side of the bag-contained pad part, the method comprising:
a molding step in which the covering part of the main portion and the pair of side pad portions are integrally molded to define a recess;
a bag body attaching step in which a to-be-held portion provided in the bag body is held in a holding portion provided in a mold, and the bag body is positioned and attached to the mold;
an injecting step in which a foamable material is injected into the mold to which bag body is attached;
a foaming step in which the foamable material in the mold is foamed to form the bag-contained pad part; and
a bag-contained pad part accommodating step in which the bag-contained pad part is accommodated in the recess defined by the covering part and the pair of side pad portions, wherein
in the bag body attaching step, the bag body is constrained so that a volume of the bag body does not increase beyond a certain level.

12. The seat pad manufacturing method according to claim 11, wherein
the holding portion is installed to protrude inside the mold so that the bag body is arranged to float inside the mold.

13. The vehicle seat according to claim 3, wherein
an incompressibility fluid is provided to be capable of being supplied to the inside of the bag body.

* * * * *